United States Patent [19]

Brown

[11] Patent Number: 5,119,442
[45] Date of Patent: Jun. 2, 1992

[54] REAL TIME DIGITAL VIDEO ANIMATION USING COMPRESSED PIXEL MAPPINGS

[75] Inventor: William B. Brown, Mountain View, Calif.

[73] Assignee: Pinnacle Systems Incorporated, Santa Clara, Calif.

[21] Appl. No.: 630,069

[22] Filed: Dec. 19, 1990

[51] Int. Cl.[5] .................... G06K 9/36; G06K 9/46; G09G 1/06; G09G 3/00

[52] U.S. Cl. .................................. 382/41; 382/56; 340/725; 340/791

[58] Field of Search ............... 382/44, 47, 41, 56; 340/723, 725, 731, 791

[56] References Cited

U.S. PATENT DOCUMENTS

| 4,665,433 | 5/1987 | Hinson et al. ................ 358/22 |
| 4,760,605 | 7/1988 | David et al. ................... 382/47 |
| 4,935,879 | 6/1990 | Ueda ............................. 382/28 |

Primary Examiner—Michael Razavi
Assistant Examiner—Michael R. Cammarata
Attorney, Agent, or Firm—Schneck & McHugh

[57] ABSTRACT

Method and apparatus for construction and use in real time of a sequence of pixel-to-pixel mappings that define a video image transformation of a sequence of video images in digital animation video image processing and display. A sequence of compressed mappings that approximate the required sequence of pixel-to-pixel mappings is constructred off-line, and this sequence of compressed mappings is stored for subsequent use and is designated by a selected indicium. When that sequence of pixel-to-pixel mappings is to be applied to a chosen set of video image fields, the sequence of compressed pixel mappings is called up by use of the indicium, the compressed mappings are decompressed, and the sequence of decompressed mappings is applied to the chosen set of video image fields in real time.

19 Claims, 8 Drawing Sheets

| PRECISE: | 2-4 BITS | 10 BITS | 2-4 BITS |

| SUB-PRECISE: | 2-4 BITS | 5 BITS | 7-9 BITS |

BACKGROUND
RUN: | UP TO 6 | 10 OR MORE |

SUB-RUN: STARTS WITH FIRST BIT=0    LS RUN LENGTH   LSB'S OF SUB-PRECISE
| 1 | 6 | 9 |

LONG RUN: | UP TO 6 | 10 OR MORE |

SHORT RUN: | 2 | 6 |

5,119,442

REAL TIME DIGITAL VIDEO ANIMATION USING COMPRESSED PIXEL MAPPINGS

TECHNICAL FIELD

This invention relates to digital video image processing and more particularly to prescribed sequences of mappings or transformations of such images in real time.

BACKGROUND ART

Methods and apparati for transformation of a sequence of video images in real time tend to fall in two classes of approaches. The word "video", as used herein, is intended to refer to any electronic display of text and/or graphics images and is not intended to be limited to the standard television images presented at 50–60 frames per second. First are hardware-intensive approaches that provide a limited number of transformations of a sequence of live video images "on the fly". These transformations include translation, rotation, compression, and variations in compression across an image to simulate curved effects. These approaches often make use of specialized hardware for pixel data filtering and interpolation to carry out any of these real time transformations. Examples of transformation apparati that incorporate these filtering and interpolation techniques are discussed in U.S. Pat. No. 4,665,433, issued to Hinson et. al., and in U.S. Pat. No. 4,760,605, issued to David et. al.

Another class of methods and associated apparati perform the video image transformations off-line and in non-real time. A video transformation mapping is applied to each of a sequence of single video images, and these mapped images are stored on a suitable video medium such as video tape. The stored images may then be called from storage and played back in real time to view the effect of this transformation. Because these video transformation mappings are not restricted to real time, the number and complexity of the allowable transformations is virtually unrestricted. Some of the transformations that may be applied here include intensity, high-light, true overlapping curvatures in three-dimensional space and metamorphosis. This will be referred to as the "off-line, non-real time" approach. The associated apparati are usually simpler, less expensive and software-intensive, but the off-line time required to perform a sequence of such transformations is often measured in hours or tens of hours. Additionally, if a video transformation mapping is applied using a new series of video images, the time consuming mapping of each image in the series must again be done before the effect can be viewed.

What is needed is a method and associated apparatus that will permit performance of a class of predetermined sequences of mappings or transformations upon an arbitrary sequence of video images in real time, which are as complex as the mappings permitted under the off-line approach described above. Preferably, the intermediate video transformation mappings should be storable in a memory of reasonable size, and each sequence of such video image transformation mappings should be retrievable quickly by selection of an indicium that is associated with that sequence of transformations.

SUMMARY OF THE INVENTION

These needs are met by a method that uses the off-line, non-real time apparati discussed above to generate a sequence of generic video transformation mappings. The pixel-to-pixel mappings themselves are stored, rather than the images resulting from their application to a particular sequence of video images. These pixel-to-pixel mappings are then applied, using real-time video image filtering and interpolation, to transform an arbitrary sequence of video images in real time. The desired video transformation pixel mappings are produced off-line and interactively, using a sophisticated sequence creation package that includes tools for storyboards, real time wire frame preview, and control of lighting, shading and high-lighting. The video transformation pixel mappings may be approximated by an approximate mapping that uses linear predictive coding, delta modulation, pulse code modulation, sine or cosine transform coding, or some other suitable approximate coding method to determine the (approximate) data address of each pixel under the original pixel-to-pixel mapping. This approximate mapping reduces the storage requirements of the transformation without adversely affecting the image quality.

The video transformation mappings are stored as an ordered sequence of such mappings, and each such sequence is provided with an indicium that corresponds and indicates a unique video transformation of a sequence of video images for later retrieval and use. By this approach, selection of a sequence of video field mappings to be applied to a sequence of video images is implemented. When a sequence of such video transformation mappings is to be applied to an arbitrary sequence of video images in real time, the appropriate indicium is selected, and the sequence of pixel mappings is called up. This sequence of pixel mappings (in compressed form or in decompressed form) is applied to the chosen sequence of video image fields, and the results of applying this sequence of pixel mappings to this sequence of fields are displayed as a sequence of video images, in real time, if desired.

As discussed below, several image parameters such as color mix, high-light, intensity, simple compositing, filtering, duration and transparency can be adjusted or changed dynamically or "on the fly", as the video images are being transformed and displayed and after the corresponding sequence of video field maps has been constructed, approximated and stored.

BEST MODE FOR CARRYING OUT THE INVENTION

Figure 1:
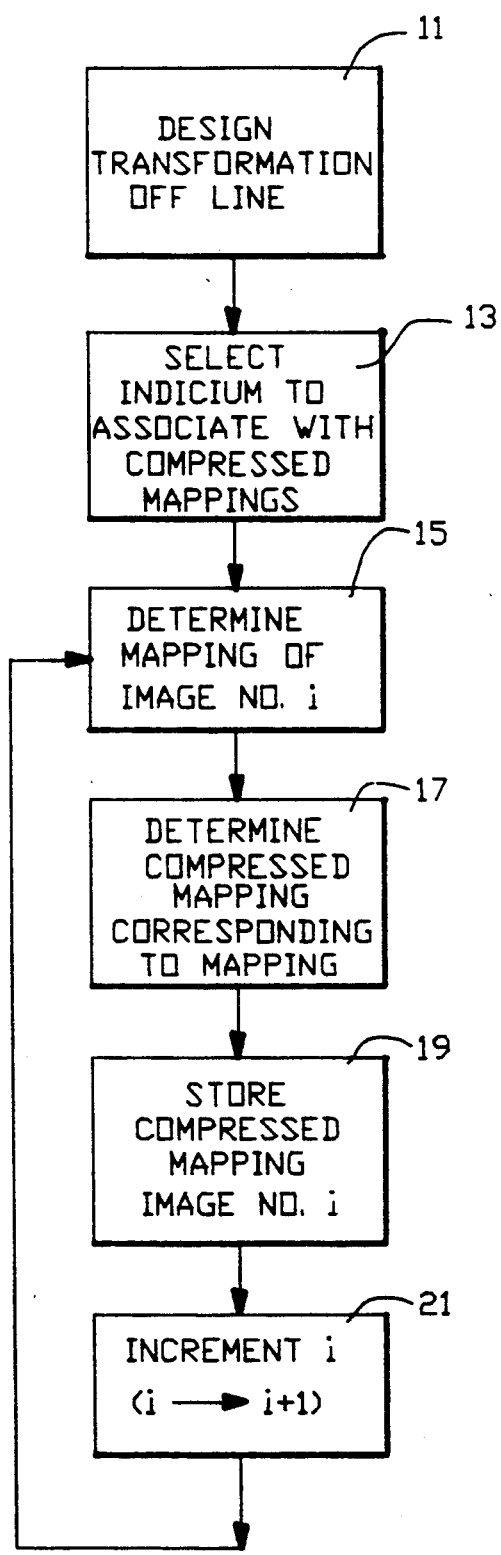
FIG. 1 is a flow diagram illustrating different elements in the method of formation of each of the sequence of video image mappings or transformations for a sequence of video image fields.

With reference to FIG. 1, the procedure for formation of a video image transformation to be applied to a sequence of video image fields begins with design of the desired transformation off-line, as indicated in block 11, using wire frame previews, story boards and sophisticated animation tools. In block 13, a particular video image mapping corresponding to the desired transformation is chosen and is given a unique indicium. In block 15, the video image mapping to be applied to video image number i ($i = 1, 2, 3, \ldots$) is constructed as a pixel-to-pixel mapping on the screen. In block 17, a compressed mapping corresponding to each of these pixel-to-pixel mappings is determined, thus reducing the storage requirements for the transformation mappings. In block 19, each of the compressed mappings corresponding to one of the sequence of original pixel-to-pixel mappings is stored in an ordered fashion for the video image fields $i = 1, 2, 3, \ldots$. The counting number i is incremented ($i > i+1$) in block 21 so that the entire sequence of video image mappings, and the corresponding sequence of compressed mappings, is constructed.

Figure 2:
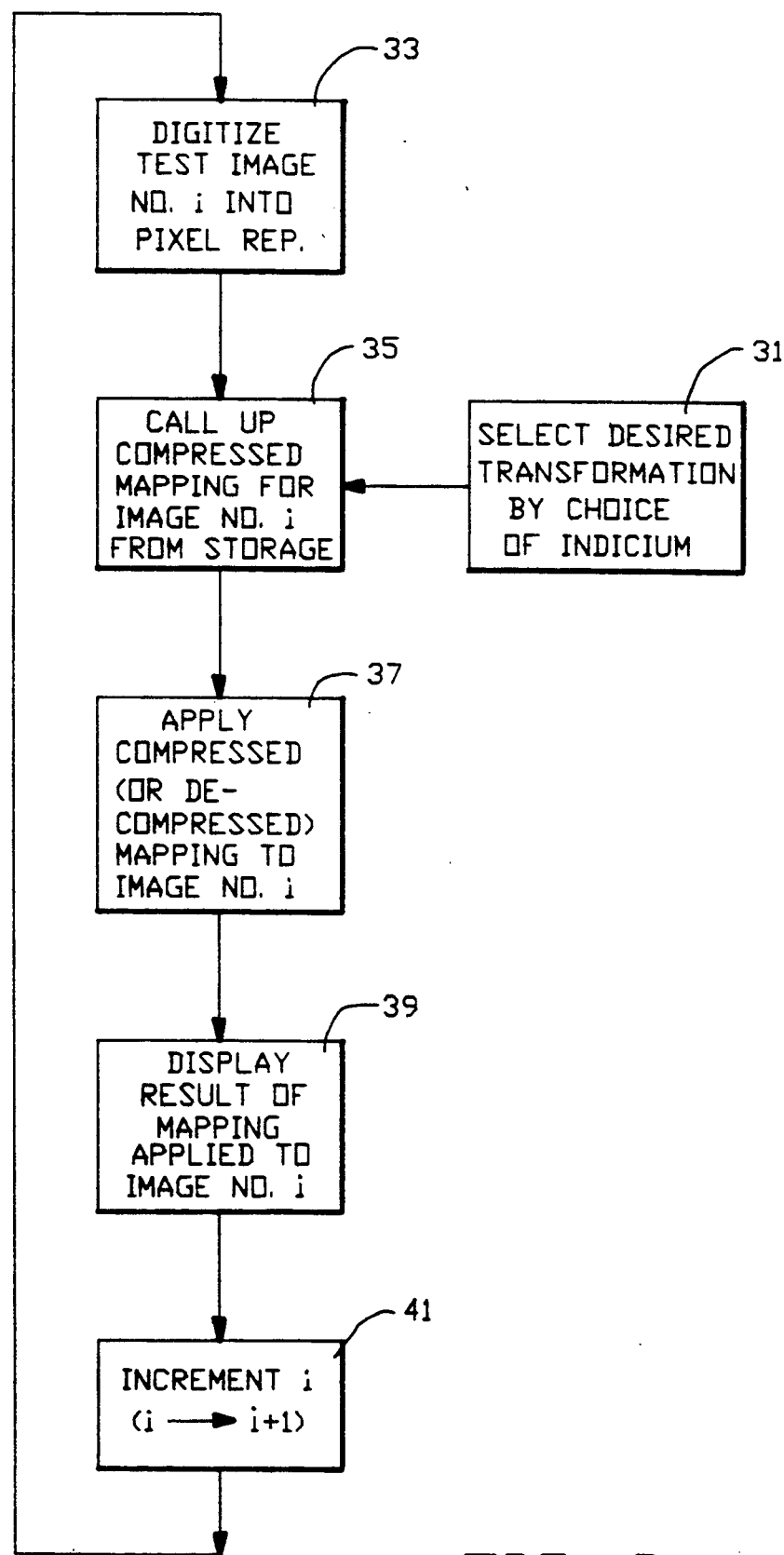
FIG. 2 is a flow diagram illustrating the elements of the method of applying a sequence of video transformations, already formed and stored, to an arbitrary sequence of digital video image fields in real time, including display of the transformed images.

FIG. 2 illustrates the playback procedure, whereby a stored sequence of compressed mappings is called up and applied to a sequence of video images in real time in order to form and display a sequence of transformed video image fields. In block 31, a transformation is selected by choosing the indicium associated with that transformation, and the corresponding compressed mappings for the video image fields numbered $i = 1, 2, 3, \ldots$ are called up from storage. In block 33, each of the sequence of chosen video image fields no. $i = 1, 2, 3, \ldots$ is digitized into a pixel representation for a video screen. In block 35 a particular sequence of compressed mappings corresponding to the indicium, is called up from storage for application to the video image fields $i = 1, 2, 3, .$ In block 37, each of the sequence of compressed mappings, or their decompressed counterparts, is applied to the sequence of video image fields $i = 1, 2, 3, \ldots$. The result of application of a particular member of the sequence of video image mappings to video image field number i is then displayed on a video screen in block 39, and the image field counting number i is incremented ($i \rightarrow i+1$) in block 41 in order to complete the sequence of image mappings applied to the sequence of video images presented. This sequence of image mappings is formed and displayed in real time.

The playback procedure may be done in real time because the sequence of compressed mappings upon which the sequence of image transformations is based is easily called up from storage and the memory requirements for the compressed mappings are modest. By use of a sequence of compressed mappings that approximate the original pixel-to-pixel mappings, the storage requirements are reduced by a factor of between 10 and 200, for reasonable error bounds on the errors introduced by use of the compressed mappings rather than use of the original pixel-to-pixel mappings.

The digital video animation ("DVA") system disclosed here (1) uses animation software off-line to determine pixel-to-pixel mappings that will implement a particular video transformation, applied to a sequence of video image fields, (2) constructs a sequence of approximate mappings, using compressed address spaces, that approximate the sequence of pixel-to-pixel mappings, and (3) offers real time playback of this sequence of approximate mappings, applied to an arbitrary sequence of live or still video image fields in real time, whenever the corresponding video transformation is to be applied to this video image field sequence.

Figure 3:
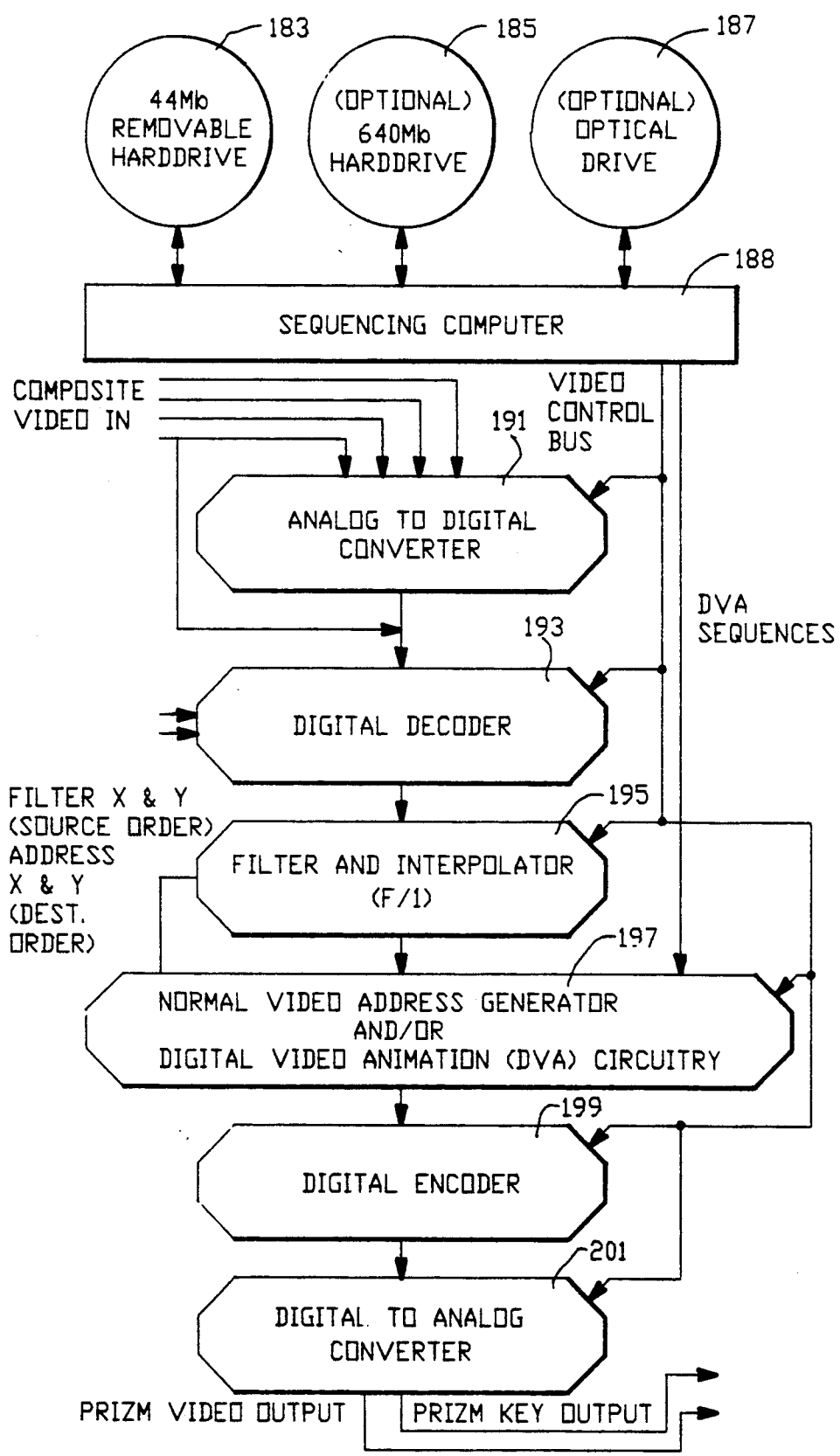
FIGS. 3, 4 and 6 are schematic views of an address generation system, a filter and image key generation system and of the overall digital video animation system according to one embodiment of the invention.

FIG. 3 illustrates one embodiment of the DVA system at a higher level. A large memory unit, which may be a removable hard drive 183, a permanent hard drive 185 or an optical drive 18 is used to store the compressed pixel mappings that were generated in FIG. 1. The information in this memory is fed to a sequencing computer 178 and this information is provided for an address generator module 197 that is discussed below. Composite video image signals are applied to an analog-to-digital converter 191 which produces a series of digital samples representing the original signal. These digital samples are then applied to a digital decoder 193 which separates the signal into three components Y, R-Y and B-Y representing the intensity, red component and blue component, respectively, of the original composite video signal. A key signal is also processed by the analog-to-digital converter 191 and the digital decoder 193 providing cut-outs and transparency to the video images that are to be transformed. The three color components and key are then supplied to a filter and interpolator frame store 195 that will filter and interpolate the video image in order to maintain image quality as the video is being transformed. The amount and type of filtering and interpolating to perform on the video image is received from the address generation circuitry 197 and is dependent on the complexity of the transformation mappings that are to be applied.

The output signals from the filter and interpolation module 195 are received by an address generator module 197 that produces normal video addresses if no video transformations are required or produces digital video animation (transformed) addresses if a sophisticated or complex video transformation is required for this sequence of video image fields. These addresses are generated using the information loaded from the memory units, 183, 185 or 187 and applying the decompression and transformation process as described in FIG. 2. The address generator module 197 will include the DVA address generation system shown in FIG. 4 and will additionally include apparatus for normal video address generation where a simplified video image transformation is required. The normal video address generation may include the "simple addressing" schemes discussed above. The output signals from the address generator module 197 are received by a digital encoder 199 that will combine the three color components back into a single digital signal representing the transformed video image. The output signals from the digital encoder module 199 are received by a digital-to-analog decoder module 201 that provides the final output signal for use in formation of the sequence of video image fields to be displayed on the video screen.

The decoder module 193, the filter and interpolation module 195, the address generation module 197, and the decoder module 201 are all driven by the video control bus.

Figure 4:
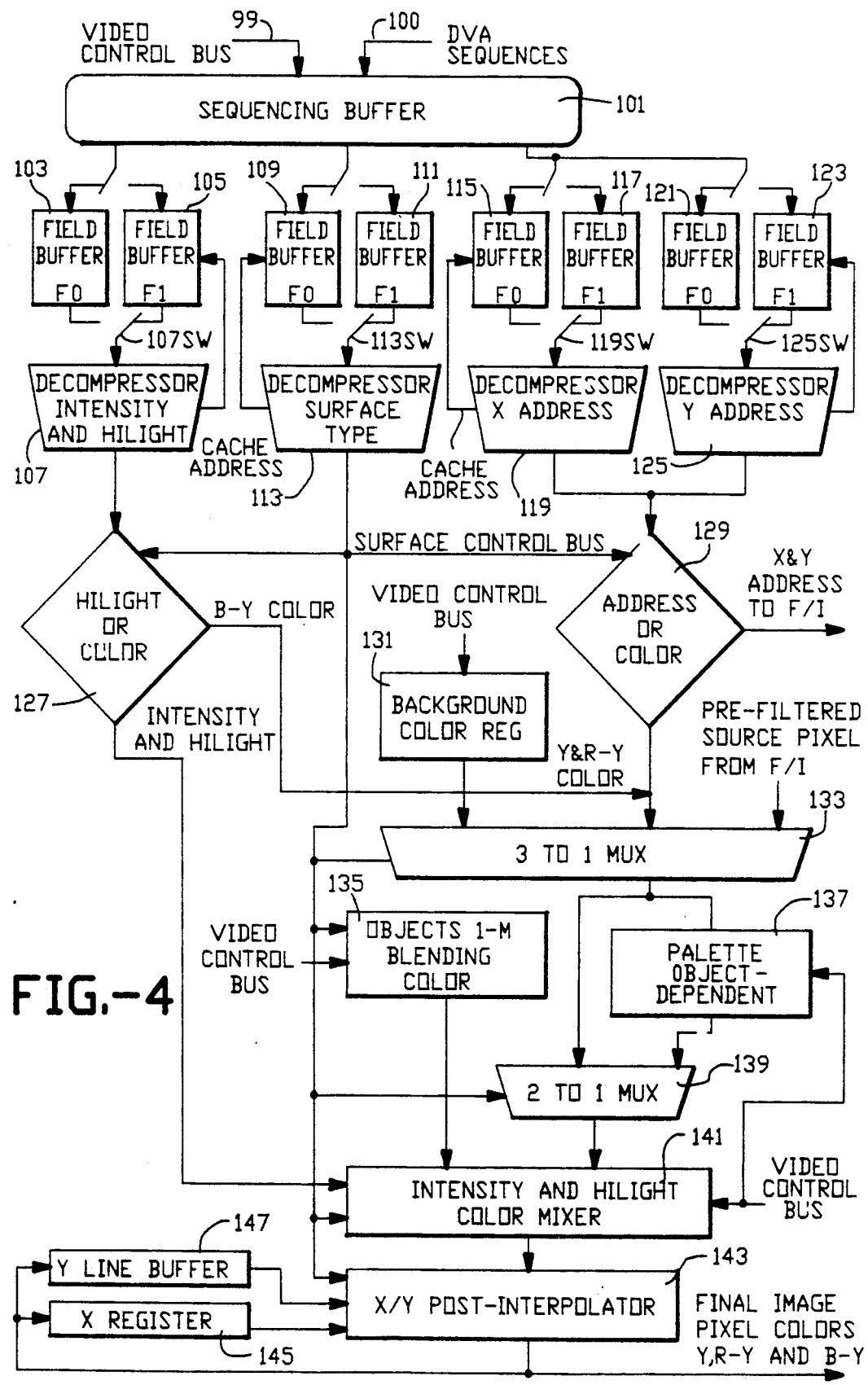

FIG. 4 illustrates one embodiment of the digital video animation ("DVA") address generation system. A sequencing buffer 101 receives control signals on a video control bus 99 and receives a sequence of digitized, compressed transformation mappings on a DVA signal line 100. A portion of the video image field information received by the buffer 101 is alternatively sent to one of two field buffers 103 and 105 that will provide the image field information for use by a first map decompression module 107 (or two such modules, as discussed above) that handles the intensity and high-light information (H).

A second pair of field buffers 109 and 111 receives from the sequencing buffer 101 field information that will be used by a second map decompression module 113 that will handle surface type information for the video image.

A third pair of field buffers 115 and 117 receives field information that will be used by a third map decompression module 119 that handles mapping of the x-coordinate of pixel data addresses.

A fourth pair of field buffers 121 and 123 receives field information that will be handled by a fourth map decompression module 125 that manipulates y-coordinates of the pixel data addresses. Each of the map decompression modules 107, 113, 119 and 125 has a switch 107sw, 113sw, 119sw and 125sw, respectively, to alternatingly draw field information from one and then from the other of each two field buffers according to the video image field to be formed for display on the video screen. The four map decompression modules 107, 113, 119 and 125 may operate in a manner illustrated in FIG. 9 below.

The output signal(s) of the H-parameter map decompression module 107 is received by a high-light/color module 127 that provides either surface high-light information or color information to be used in formation of a video image field. The intensity and high-light information is sent to a high-light/color mixer module 141 that is discussed below. Color information, which may be prescribed by the well known Y, B-Y and R-Y color parameters, is combined with other color information provided by an address/color module 129 for use in color image formation. The operations of the high-light/color module 127 and the address/color module 129 are controlled by an output signal received from the second map decompression module 113 on a surface controlled bus.

The address/color module 129 receives information from the third and fourth map decompression modules 119 and 125. Input signals from the surface control bus are used as a criteria for passing the decompressed information to one of two modules. If the surface control bus indicates the current information represents an address; and x-coordinate and y-coordinate pixel data address information is sent to a filter/interpolation ("F/I") module 195 that was shown and previously discussed in connection with FIG. 3. Alternatively, if the surface control bus indicates that the current information is a color; the Y and R-Y color information is sent, in combination with the B-Y color from the high-light or color module 127, to the 3-to-1 MUX 133.

The DVA address generation system also includes a background color register 131, driven by the video control bus 99, that provides Y, R-Y and B-Y information for any background color run that may be present in the current video image field. A three-to-one multiplexer ("MUX") 133 receives input signals from the address/color module 129 and from the background color register 131, and receives prefiltered image pixel data from the F/I module 195 (FIG. 3) and issues one of these three input signals as an output signal, based upon a control signal received from the map decompression module 113 on the surface control bus as shown.

The output signal from the MUX 133 is received by a palette module 137 that provides up to $2^{16}$ colors for use in formation of the video image field. The output signal from the MUX 133 is also received by a two-to-one MUX 139 that also receives the output signal from the palette module 137. One of these two input signals is selected as the output signal from the MUX 139 by a control signal received from the second map decompression module 113 on the surface control bus. The output signal from the MUX 139 is received by an intensity and high-light color mixer module 141 that is driven by the video control bus and by the surface control bus. The color mixer module 141 also receives an output signal from the high-light/color module 127 and receives an output signal from an object 1,2, ..., M ($M \geq 4$) blending color module 135 as shown. The color mixer module 141 combines the blending color and the color signal from the MUX 139 as a function of (1) the high-light and intensity values received from the high-light/color module 127, (2) the surface control bus signal from the surface map decompressor module 113 and (3) the video control bus signal received on the line 99. The high-light, color intensity and color specifications may be changed, using the module 141, after the sequence of video image mappings representing the transformation T is constructed and stored, because the transformation T does not depend upon these specifications. This provides additional freedom in specification of the transformed video images.

The output signal of the color mixer module 141 is received by an x/y post-interpolator module 143. The interpolator module 143 receives previous x-coordinate pixel data from an x register 145 and receives previous y-coordinate line data from a y line buffer 147 and is driven by the surface control bus. The post-interpolator module 143 will receive the decompressed video image field information and provide a smooth image, where appropriate, as a sequence of output signals for the final image and the corresponding pixel colors Y, B-Y and R-Y.

The surface type decompressor module 113 in FIG. 4 produces a sequence of commands at a pixel rate (roughly 13.51 MHz in one embodiment) that controls the choice of high-light or color intensity output signal from the module 127, the choice of address or color output signal from the module 129, the choice of one the three input signals as the output signal from the three-input MUX 133, the choice of an output signal from the blending color module 135, the choice of one of two input signals as the output signal from the two-input MUX 139, the choice of color mixing ratio in the color mixer module 141, and the choice of an x and y post-interpolation scheme in the interpolator module 143.

For a given pixel address $(x,y) = (x_n, y_m)$, the post-interpolator module 143 receives individual pixel values $(x_n, y_{m-1})$ pixel-by-pixel, for the preceding line in that field from the y line buffer 147 and the preceding pixel value $pv(x_{n-1}, y_m)$ from the current line from the x register 145. The line buffer 147 behaves as a FIFO register with wraparound: As the preceding line $y = y_{m-1}$ of pixel values pass through the line buffer 147, pixel values for the current line $y = y_m$ in that field begin moving through that buffer. For a given pixel address $(x,y) = (x_n, y_m)$, the post interpolation module 143 uses a linear combination of the pixel values for the addresse $(x_{n-1}, y_m)$, the post interpolation module 143 suitably interpolated pixel value for the position $(x_n, y_m)$ that will be displayed as the final image on a video screen. That is, the interpolated pixel value is defined by $$pv_{int}(x_n,y_m) = c_0 pv(x_{n-1},y_m) + c_1 pv(x_n,y_m) + c_2 pv(x_n, y_{m-1}). \quad (1)$$

$$c_0 + c_1 + c_2 = 1. \quad (2)$$

Figure 5:
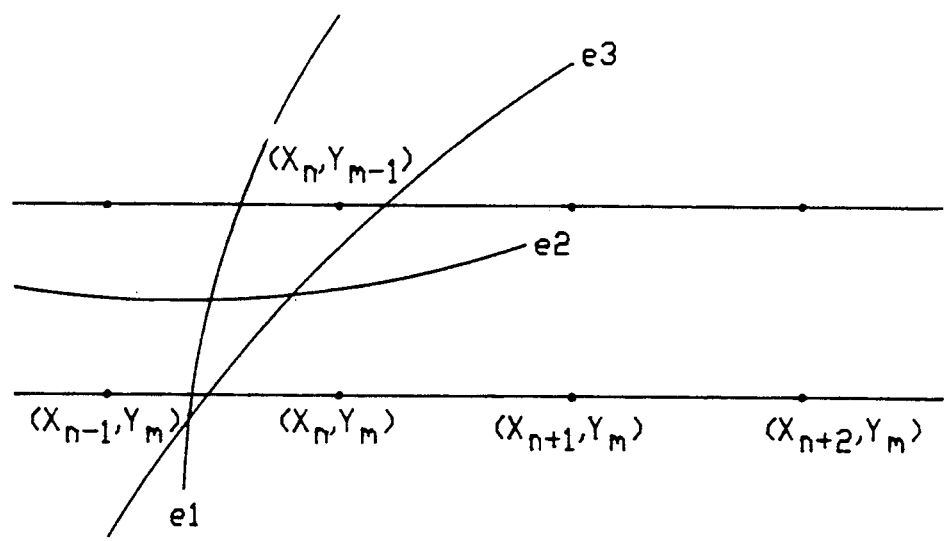
FIG. 5 illustrates the use of pixel values for pixel adjacent to an edge to determine an edge transition.

This interpolated pixel value takes account, among other things, of the presence of an "edge" (a line or curve defining a hard shift from one object to another by the chosen video transformation) that separates or falls between the pixel address $(x_n,y_m)$ and at least one of the pixel addresses $(x_{n-1},y_m)$ and $(x_n, y_{m-1})$ Three examples of edges, denoted e1, e2 and e3, that separate the pixel address $(x_n,y_m)$ from at least one of these latter two pixel addresses are shown in FIG. 5. As an edge, such as e3, moves toward the pixel address $(x_n,y_m)$ and away from the pixel address $(x_{n-1}, y_m)$ or away from the pixel address $(x_n, y_{m-1})$, the coefficient $c_0$ or $c_2$, respectively, will tend to zero and the coefficient c1 will tend toward one in this embodiment. With reference to the edge e1 or e3, all pixel addresses on the line $y = y_m$ to the left of address $(x_n,y_m)$ lie on one object (say, object no. 1) or have a first color, and all data addresses on this line lying to right of address $(x_{n-1},y_m)$ lie on a second object (say, object no. 2) or have a second color. Thus, a hard transition or edge occurs on the line $y = y_m$ between the two pixel addresses $(x_{n-1},y_m)$ and $(x_n,y_m)$.

In a second embodiment for the treatment of edges, the presence of an edge, such as e3, adjacent to the pixel address $(x_n,y_m)$ is temporarily ignored and the pixel values, denoted $pv(x_{n+k},y_m)_1$ $k = 0,1, \ldots, N$; N a non-negative integer), are computed as if object no. 1 (or color no. 1) extends to the right of the edge e3 on the line $y = y_m$ for the next N+1 pixels. These pixel values $pv(x_{n+k},y_m)_1$ may be determined predictively, using a linear prediction algorithm, or may be determined in any other suitable manner. The pixel values for the pixel addresses $(x_{n+k},y_m)$ $(k = 0,1, \ldots, N)$, where the presence of the edge e3 is taken account of, are denoted $pv(x_{n+k},y_m)_2$. The interpolated pixel value for the next N+1 pixel addresses $(x_{n+k},y_m)$ now becomes a "blend" of the pixel values, accounting for the presence an edge, and is defined by $$pv(x_{n+k},y_m)int = c_1(k) pv(x_{n+k},Y_m) + c_2(k) pv(x_{n+k},y_m)_2 (k = 0,1 \ldots, N), \quad (3)$$

$$c_1(k) + c_2(k) = 1. \quad (4)$$

Use of this second embodiment for the treatment of edges allows a softening or apodization of the associated edge so that the transition from object (or color) no. 1 to object (or color) no. 2 is not a sharp or hard transition as suggested in FIG. 5. The transition extends over N+1 pixels on the line $y = y_m$, where this second embodiment is used. A preferred embodiment here is a combination of these two interpolation methods, where $pv(x_{n+k},y_m)$int is linearly combined with the pixel value from the preceding line, $pv(x_n+k,y_{m-1})$, so that the current pixel value becomes comes $$pv(x_n,y_m) = c_0 pv(x_n,y_m) + c_1 pv(x_n,y_{m-1}) \quad (5)$$

$$c_0 + c_1 = 1 \quad (6)$$

Figure 6:
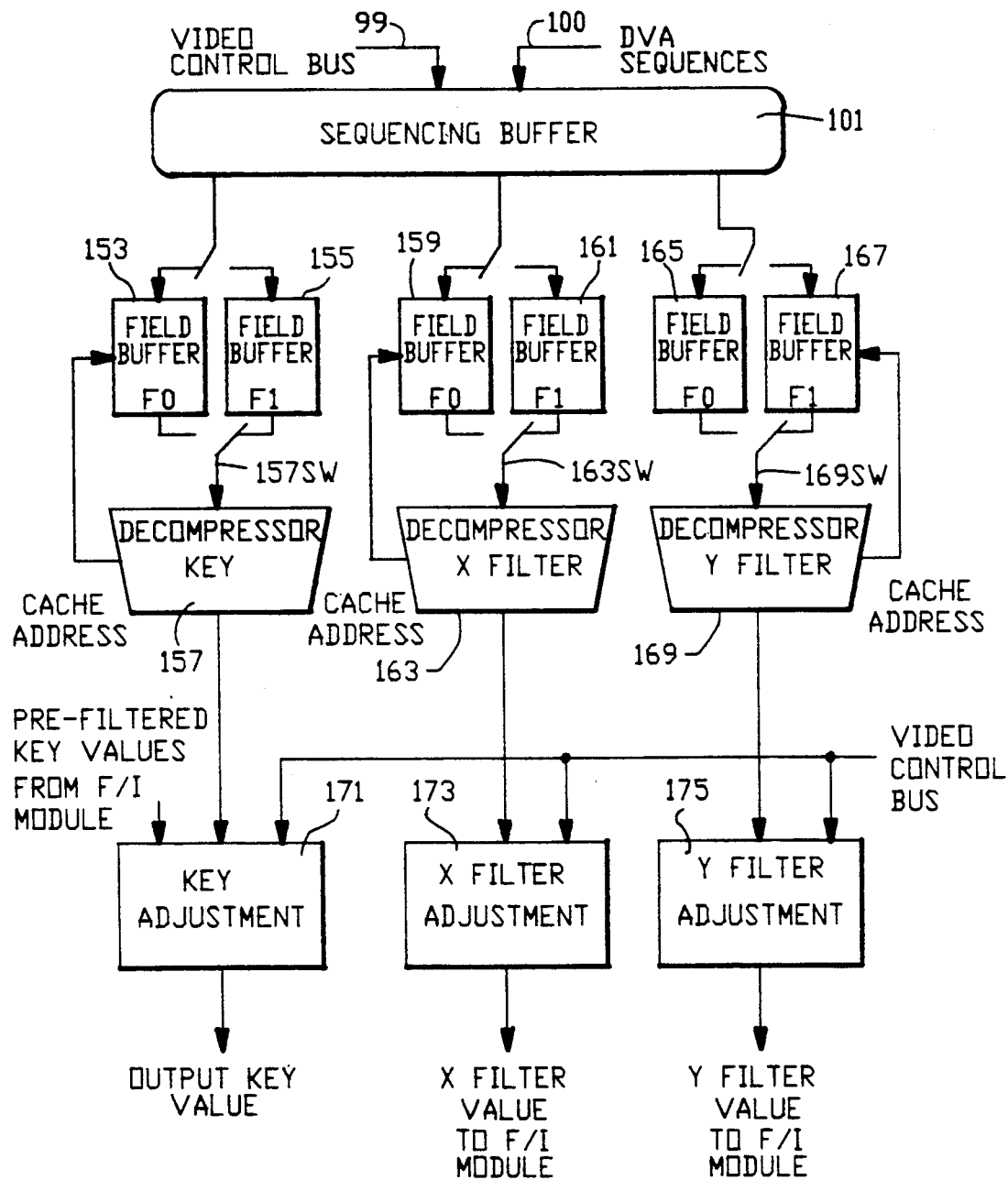

FIG. 6 illustrates the DVA filter and key generation system in one embodiment. A fifth pair of field buffers 153 and 155 receives image key information from the sequencing buffer 101 and provides this information for a fifth map decompression module 157 that provides image key information for the field to be formed.

A sixth pair of field buffers 159 and 161 receives information from the sequencing buffer 101 and provide this for a sixth map decompression module 163 that provides information on the x-coordinate filter to be used to form a pre-filtered image. A seventh pair of field buffers 165 and 167 receives information from the sequencing buffer 101 and provide this information for a seventh map decompression module 169 that provides y-coordinate filter information. The fifth, sixth and seventh map decompression modules 157, 163 and 169 have associated switches 157sw, 163sw and 169sw, respectively, to alternatingly draw information from one or the other of the two field buffers associated with that map decompression module.

An image key adjustment module 171 receives an output signal from the fifth map decompression module 157 and receives pre-filtered image key values from the F/I module 195 (FIG. 3). The key adjustment module 171 is driven by the video control bus and produces an output image key value for use in forming a composite video image.

An x filter adjustment module 173 and a y filter adjustment module 175 receive the output signals from the sixth and seventh map decompression modules 163 and 169, respectively, and are driven by the video control bus. The x and y filter adjustment modules 173 and 175 produce output signals that are the x filter values and y filter values to be fed to the filter and interpolation module 195 in FIG. 3.

Figures 7, 8:
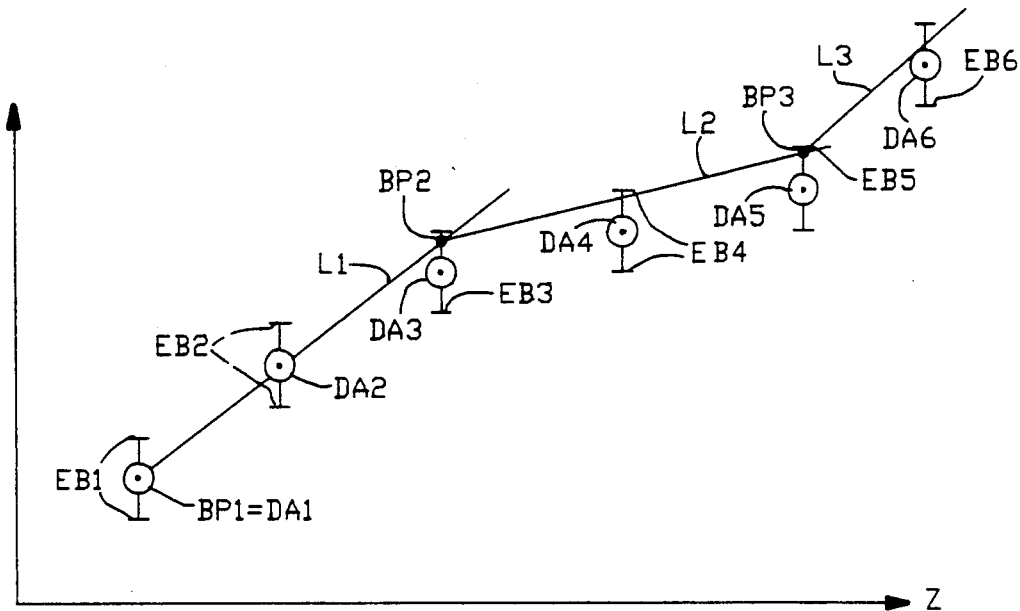
FIG. 7 illustrates application of one form of linear prediction applied to pixel address information according to a compression technique used in the invention.
FIG. 8 illustrates the format of six command/data fields for data address specification according to one embodiment of the invention.

FIG. 7 illustrates one approach used in the invention for constructing a compressed mapping that corresponds approximately to a desired pixel-to-pixel mapping of a video image field. This compressed mapping embodiment is suitable for any mathematically generated data, relief maps or three dimensional models, but is especially well suited for address space. In FIG. 7, the ordinate (y-axis) is a coordinate w representing one of the following source pixel addresses: x-address (of the pixel), y-address, high-light or intensity. These source pixel addresses will be collectively referred to herein as Descriptive Coordinates, which describe a source pixel address. The abscissa (x-axis) coordinate is a coordinate v representing the x-address of the pixel destination, for constant y-address of the pixel destination. That is, for each value of the pixel destination y-address ($y_{dest}$ = constant), a graph of $w = w_m$ versus $v = v_m$ is presented for a sequence of pixel coordinates (m = 1,2, ..., M) on the screen. The coordinate $v = v_m$ will be referred to as the destination data address or destination x-address corresponding to a source data address $w = w_m$. The pair $(v_m, w_m)$ will be referred to simply as a data address pair on the graph in FIG. 7.

A first line segment L1 is constructed so that it passes through the first pixel destination data address pair $(v_i, w_1)$, designated DA1, in a pixel line, passes adjacent to data address pair $(v_w, w_2)$, designated DA2, and continues in a linear manner as shown. The line segment L1 will pass adjacent to a consecutive sequence of other data address pairs DA2, DA3, DA4, . . . , and one concern here is whether the line segment L1 will pass sufficiently close to each of these subsequent data points so that the line segment L1 can be used as a reasonable approximation for the positions of these data address pairs ($v_m, w_m$). An error bound indicated by two horizontally oriented bars denoted EBj (j=1, 2, 3, . . . ) for the upper and lower error bounds (fixed or variable) corresponding to source data address number j ($w=w_j$). The line segment L1 is constructed in FIG. 7 to pass directly through the first data address pair ($v_1, w_1$) or DA1 (=BP1) and sufficiently close to data address pair DA2 so that the error bounds thereon are automatically satisfied. At the data address pair ($v_3, w_3$) or DA3, the vertical error bounds EB3 are positioned as shown. The line segment L1 passes between these two error bars as it passes adjacent to the data address pair DA3. Thus, the line segment L1 is also a sufficiently good approximation for the data address pair DA3. The data address pairs DA1, DA2 and DA3 on the graph in FIG. 7 will be said to "Belong To" line segment L1 when the error bar criteria are satisfied for these consecutive data addresses.

However, when the line segment L1 passes adjacent to the next consecutive data address pair ($w_4, w_4$), shown as DA4 in FIG. 7, this line segment does not pass between the two error bars EB4. Thus, the line segment L1 does not provide a sufficiently good approximation for the data address pair DA4, and a new line segment L2 must be constructed, beginning at the intersection BP2 of the preceding line segment L1 with a vertical line drawn through the last acceptable data address pair DA3 for the line L1. As shown in FIG. 7, the new line segment L2 begins adjacent to the immediately preceding data address pair DA3, passes adjacent to the data address pair DA4, and is extended linearly. In FIG. 7, the line segment L2 does pass sufficiently close to the next data address pair DA5 so that the line segment L2 offers a sufficiently good approximation for this next data address. However, as can be seen from FIG. 7, the line segment L2 does not pass between the two error bars EB6 as it passes adjacent to the data address pair DA6. Thus, a new line segment L3, beginning at a point BP3 adjacent to data address pair DA5 and passing adjacent to the data address pair DA6 would be constructed here. This process is continued to construct a sequence of line segments L1, L2, L3, . . . so that each data address DAj (j=1, 2, 3, . . . ) lies sufficiently close to, and thus Belongs To, at least one of these line segments. Each of these line segments Lj may be represented by an intercept parameter $b_j$ and a slope parameter $s_j$ so that the equation for the line segment Lj becomes $w = s_j v + b_j$ in a two-dimensional Cartesian coordinate system. The sequence of line segment parameters $\{(s_j, b_j)\}_j$ defines an approximate mapping of the "line" of data address pairs on a video screen (for a constant value of the destination y-address). However, the collection of two-parameter descriptions $\{(s_j, b_j)\}_j$ can approximately represent the collection of data address pairs DAj in that line, with dramatically reduced memory requirements as compared to representation of each of the sequence of data addresses by its exact pixel address.

The intercept parameter $b_j$ for the line segment Lj is determined by the beginning point BPj as indicated in FIG. 7 so that only the slope $s_j$ for the line segment Lj is variable. Given the beginning point BPj of line segment Lj adjacent to data address pair DAm, the slope $s_j$ is varied to maximize the number of consecutive data address pairs DA(m), DA(m+1), . . . , DA(N) for which the line segment Lj passes between the error bar pairs EB(m), EB(m+1), . . . , EB(M). The error bar pairs EBj may be chosen so that each error bar of this pair lies above or below the corresponding data address pair DAj by precisely a fixed fraction f of the pixel-to-pixel nearest neighbor distance, or the fractions f may vary from one data address to the next. The fraction f might vary with the level of compression of the video image, for example.

FIG. 7 illustrates a sequence of consecutive data address pairs in coordinate (horizontal) direction, possibly corresponding to a destination y-address line in a video screen for which v=constant, where (v,w) form a pair of Cartesian coordinates on the video screen. The coordinate w shown in FIG. 7 may represent the source pixel coordinate x, the source pixel coordinate y, (measured in a horizontal or vertical direction, respectively) or a parameter H=intensity/high-light. Each of these three data address prescriptions x, y and H is mapped similarly by a compression mapping as illustrated in FIG. 7. Alternatively, the intensity and high-light parameters may be separately represented, each by an n-bit word that provides $2^n$ levels of magnitude for that parameter, with each of these two parameter maps being compressed as the x and y address maps are compressed in FIG. 7.

Each of the three data address prescriptions x, y and H for the coordinate w is described by an 8-bit (one-byte) or a 16-bit (two-byte) numerical field, with the first sub-field of 1 to 6 bits being a command and the remaining sub-field of 7 to 14 bits representing an integer plus fraction in binary form that is associated with that command. The formats for six fields are illustrated in FIG. 8. The notch (—⌢—) in the data portions of the Precise, Sub-precise and Sub-run fields represents the binary digital "decimal point" in each of these fields, and these fields have been positioned so that these "decimal points" line up with one another as shown in FIG. 8. The first field, Precise, gives the precise data address of a pixel, within the limits of accuracy available by use of 12-14 bits. The upper 10 of the 12-14 bits in the second sub-field give the x-address (or y-address or H-address) for that pixel. The lower 2-4 bits in this second sub-field are used to designate a fractional pixel address $f_p 2^m$ ($f_p = 0, 1, 2, \ldots, 2^{m-1}$; m=2,3 or 4) that is to be added to (or subtracted from) the 10-bit pixel address to designate the precise data address. The total data address designated by the 12-14 bit contents of the second sub-field of the Precise field is thus stated as $M + f_p 2^m$, where $M = 1, 2, 3, \ldots, 10$-24 and $f_p = 0, 1, 2, \ldots, 2^{m-1}$.

The second field, Sub-precise, is used when the corresponding data address Belongs To a new line segment, as, for example, the data address DA3 Belongs To new line segment L2 as well as to the preceding line segment L1. In this instance, the m-bit command (m=2,3 or 4) (first) sub-field indicates this Belonging To association and the remaining 12-14 bit sub-field indicates the correction required of the preceding line segment parameter(s) (line segment slope and beginning point) to describe the new line segment. Here, the total data address is stated as $N + f_s/s^n$ where $N = 0, 1, 2, 3, \ldots, 31$ and $f_s = 0, 1, 2, \ldots, 2^n - 1$; with n=7, 8 or 9. Use of the Sub-precise field, as distinguished from the Precise field, as the fractional part of the data address, $f_s/s^n$, has approximately $2^5=32$ times better resolution than does the fractional part of the Precise field. This allows more precise adjustment of the slope of a new line segment Lj in FIG. 7, where only a small slope adjustment is required.

The Sub-run field has three sub-fields: (1) a one-bit command sub-field, used to distinguish the subrun field from all others; (2) a 9-bit sub-field that contains the nine least significant bits ("LSBs") that appear in the data address sub-field of the Sub-precise field; and (3) a 6-bit sub-field that designates the run length (RL=1-64) of this run of consecutive data addresses that Belong To the current line segment. If a run of K consecutive data addresses Belongs To a new line segment, the Sub-run field is used if the line segment parameters corrections given by the nine LSB bits of the Sub-precise field are sufficient to correct the preceding line segment parameters for the next data address. If the line segment parameters corrections of the Subprecise field are insufficient to provide an accurate correction, or RL is between 65 and 128, another field, Short Run, is used together with the Sub-precise field, and the last six bits of the Short Run field are the binary representation of the excess run length number RL−64 ($1 \leq RL-64 \leq 64$). If the nine LSD bits of the Sub-precise field are insufficient to provide an accurate correction or RL is between 65 and 1024, the Long Run field is used together with the Sub-precise field, and the second sub-field of 10 or more bits in the Long Run field is the binary representation of the run length number RL−64 ($65 \leq RL-64 \leq 960$). Thus, either (1) the Precise field is used or (2) the Sub-run field is used or (3) the Sub-precise and Short Run fields are used or (4) the Sub-precise and Long Run fields are used, to describe a data address that is part of an active video image and is not part of a background image. Note that the second sub-field of the Sub-precise field and the 9-bit second sub-field of the Sub-run field illustrated in FIG. 8 set forth a slope correction $\Delta S_j$, as used in connection with FIG. 7 for the preceding line segment.

Substantial portions of a video screen may be filled with a background color (or background color and texture), and the Background Color Run field shown in FIG. 8 takes account of this. The first sub-field of up to 6 bits of the Background Run field distinguishes the command corresponding to that circumstance, and the second sub-field of 10 or more bits is a binary representation of the pixel run length $N_B=1-1024$ of consecutive data addresses that are part of a background color run.

The compression of data addresses is preferably treated in the following manner. For any pixel position j on the abcissa (z-axis) in FIG. 7, let w(j) = actual data address ordinate value,
C(j) = compressed data address ordinate value,
$\epsilon(j) = w(j) - C(j)$ = ordinate error value,
$\epsilon_j$ = maximum permissible error magnitude ($|\epsilon(j)| \leq \epsilon_j$)
v(j) = data address abscissa value.

Assume that the compressed data address values for the pixels $i, i+1, \ldots, j-1$ all lie on a single predictor line (the "current predictor line") where pixel position i is the first such pixel on this line.

The prediction line slope s(j) at pixel position j has the range $$s_j = \frac{C(j) - C(i) - \epsilon_j}{V_j - V_i} \leq s(j) \leq \frac{C(j) - C(i) + \epsilon_j}{v_j - v_i} = \bar{s}_j \quad (7)$$

One of six mutually exclusive events occurs:

$$\overset{\vee}{s_j} < max[\overset{\vee}{s_{i+1}}, \overset{\vee}{s_{i+2}}, \ldots, \overset{\vee}{s_{j-1}}] = (max)_{i+1,j-1}; \quad (1)$$

$$\overset{\wedge}{s_j} \geq (max)_{j-1} \text{ and } \overset{\vee}{s_j} < (max)_{i+1,j-1}; \quad (2)$$

$$(max)_{i+1,j-1} \leq \overset{\vee}{s_j} < \overset{\wedge}{s_j} \leq min[\overset{\wedge}{s_{i+1}}, \overset{\wedge}{s_{i+2}}, \ldots, \overset{\wedge}{s_{j-1}}] = (min)_{i+1,j-1}; \quad (3)$$

$$\overset{\vee}{s_j} \leq (min)_{i+1,j-1} \text{ and } \overset{\wedge}{s_j} \leq (min)_{i+1}; \quad (4)$$

$$\overset{\vee}{s_j} > (min)_{i+,j-1}; \text{ or} \quad (5)$$

$$\overset{\wedge}{s_j} \geq (min)_{i+1,j-1} \text{ and } \overset{\vee}{s_j} \leq (max)_{i+1,j-1}. \quad (6)$$

If any of the possibilities no. (2), (3), (4) or (6) occurs, the current predictor line may be extended to the pixel position j, with the compressed data value C(j) being defined by the intersection of the current predictor line with a vertical line at pixel position j. The $j^{th}$ data address pair DAj then Belongs To the current predictor line.

If one of the possibilities (1) or (5) above occurs, a new predictor line is begun at the last valid pixel position $j-1$, with a suitable ordinate value $Z_{j-1}$ in the range $(max)_{j-1} \leq Z_{j-1} \leq (min)_{j-1}$ being chosen as the anchor point or initial estimate of the first data address value for this new line. Suitable ordinate values $Z_{j-1}$ includes the arithmetic mean $$Z_{j-1} = [(max)_{j-1} \cdot (min)_{j-1}]/2, \quad (8)$$

the geometric mean $$Z_{j-1} = [(max)_{j-1} \cdot (min)_{j-1}]^{\frac{1}{2}} \quad (9)$$

(assuming both values within the square root symbol have the same sign), the upper extreme $$Z_{j-1} = (min)_{j-1}, \quad (10)$$

and the lower extreme $$Z_{j-1} = (max)_{j-1}. \quad (11)$$

The permissible range of slopes of this new predictor line, at the pixel positions, $j, j+1, j°2, \ldots$, denoted $s(j+k)$ ($k=0,1,2,\ldots$), are determined by $$\overset{\vee}{s_{j+k}} = \frac{w(j+k) - Z_{j-1} - \epsilon_{j+k}}{v_{j+k} - v_{j-1}} \leq s(j+k) \leq \quad (12)$$

$$\frac{w(j+k) - Z_{j-1} + \epsilon_{j+k}}{v_{j+k} - v_{j-1}} = \overset{\wedge}{s_{j+k}},$$

and the analysis and extension of this new predictor line continues as set forth above for the preceding predictor line.

A suitable procedure for construction of the sequence of lines together that approximately match the data address pair DAm ($m=1,2,\ldots,M$) is as follows. Choose an error interval $\epsilon_j (j=1,2,\ldots,M)$ for each data address pair DAj, which may be constant or may vary with the index j. If the actual data address pair DA j has the coordinates $(v_j, w_j)$, for each such coordinate pair define $$\hat{s}_j = (w_{j+1} + \epsilon_j - w_j)/(v_{j+1} - v_j), \quad (13)$$

$$\check{s}_j = (w_{j+1} - \epsilon_j - w_j)/(v_{j+1} - v_j), \quad (14)$$

$$\hat{S}_{j,k} = min[\hat{s}_j, \hat{s}_{j+1}, \ldots, \hat{s}_k], \quad (15)$$

$$\check{S}_{j,k} = max[\check{s}_j, \check{s}_{j+1}, \ldots, \check{s}_k] \quad (j \leq j \leq k \leq M). \quad (16)$$

Define K1 as the largest integer k in the range $1 < k \leq M$ for which $$\hat{S}_{2,k} \geq \check{S}_{2,k} \text{ for } k=2,3,4,\ldots,k1. \quad (17)$$

Such a value k1 clearly exists because k=2 satisfies Eq. (17) and k1 is limited at the upper end by the integer M. A line segment L1, defined by relation $$w = S_1(v - v_1) + w_1 \quad (\check{S}_{2,k1} \leq S_1 \leq \hat{S}_{2,k1}). \quad (18)$$

will pass between the two error bars EGj for $j=1,2,\ldots,K1$ but will not pass between the two error bars EB(k1+1). Set $$w'_{k1} = S_1(w_{k1} - w_1) + w_1, \quad (19)$$

and let k2 be the largest integer k, if any, in the range $k1 < k \leq M$ for which $$\hat{S}_{k1,k} \geq \check{S}_{k1,k} \text{ for } k=k1+1, k1+2, \ldots, k2 \quad (20)$$

Again, such a value k2 clearly exists if k1<M because k=k1+1 satisfies Eq. (20) and k2 is limited at the upper end by the integer M. A line segment L2, defined by the relation $$w = S_2(V - v_{k1}) + w'_{k1} \quad (\check{S}_{k1,k2} \leq S_2 \leq \hat{S}_{k1,k1}). \quad (21)$$

will pass between the two error bars EBj for $j=k1, k1+1, \ldots, k2$ but will not pass between the two error bars EB(k2+1). Now set $$w'_{kw} = S_2(v_{k2} - v_{k1}) + w'_{k1} \quad (22)$$

and let k3 be the largest integer k, if any, in the range $k2 < k \leq M$ for which $$\hat{S}_{k2,k} \leq \check{S}_{k2,k} \text{ for } k=k2+1, \ldots, k3 \quad (23)$$

This procedure is continued until the end of the pixel line (m=M) is reached for a data address $DA_m$ on the screen. This procedure is repeated for each pixel line (U=constant) on the screen and is repeated for each of the four Descriptive Coordinates. w=source x-address, w =source y-address, w32 source highlight and w=source intensity.

Figure 9:
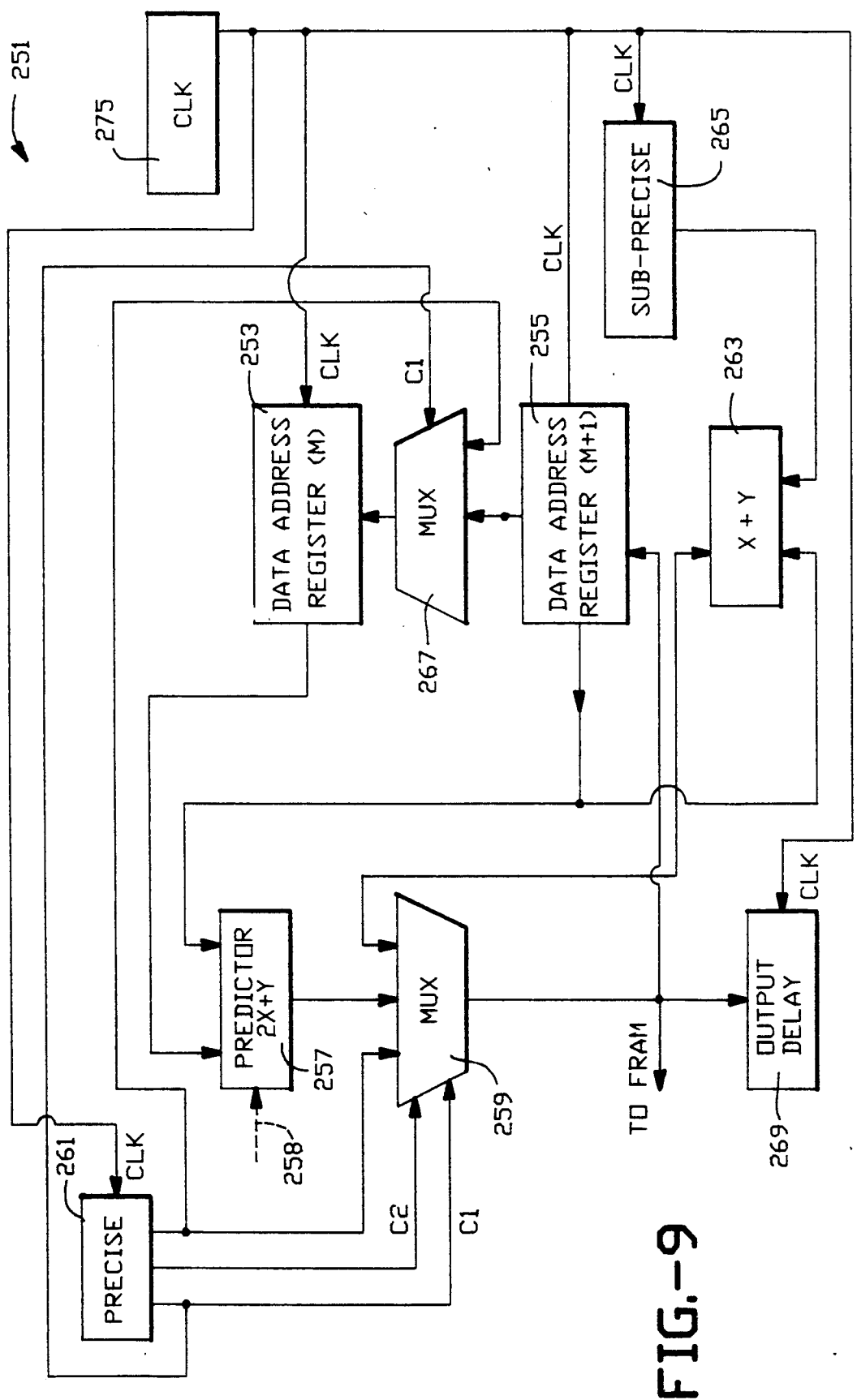
FIG. 9 is a schematic view illustrating operation of the data address prediction apparatus associated with a decompression pixel mapping according to the invention.

FIG. 9 illustrates the operation of one embodiment of line segment mapping decompression apparatus 251 that is used to implement a decompression mapping in accordance with the invention. A first register 253 and a second register 255 receive and store first and second consecutive data addresses DAm and DA(m+1), respectively, associated with a line of pixels. These two registers 253 and 255 issue their current data addresses as output signals, at time intervals determined by a clock signal CLK, that are received by a predictor module 257 that predicts and issues a predicted value of the next consecutive data address, from the information received from the two registers 253 and 255. This prediction is made, assuming that the next consecutive data address will Belong To the line segment associated with the two immediately preceding data addresses. Operation of a multiplexer 267 inserted between the two data address registers 253 and 255 is discussed below.

For example, if the data address coordinate w is written as $W=W(v_j)$ (j=1, 2, 3, ...), if $W(v_m)$ and $w(v_{m+1})$ are two consecutive data addresses contained in the registers 253 and 255, respectively, the next consecutive data address might be predicted to be $$\begin{aligned} w(v_{m+2}) &= [w(v_{m+1})(v_{m+2} - v_m) + \\ &\quad w(v_m)(v_{m+1} - v_{m+2})]/(v_{m+1} - v_m) \\ &= 2w(v_{m+1}) - w(v_m). \end{aligned} \quad (48)$$

In this example, the predictor module 257 would multiply the two input coefficients $w(v_m)$ and $w(v_{m+1})$ by the respective coefficients $-1$ and $+2$ and add these two values to produce the predictor output signal, the predicted value of $w(v_{m+2})$. If the consecutive coordinate differences $v_{m+1} - v_m = \Delta_{m+1}$, are not uniform, the predictor module would also receive one or more input signals on a signal line 258 (optional), representing the coordinate differences $\Delta_{m+1}$ and $\Delta_{m+2}$, in order to predict the next consecutive data address according to some prediction algorithm such as Eq. (1) above. Use of the signal line 258 is unnecessary here because the z-coordinate differences $\Delta m$ are uniform in the preferred embodiment.

The output signal from the predictor module 257, is the predicted next consecutive data address, assuming that this next address lies Belongs To the current line segment. This output signal is passed to one of three input terminals of a first multiplexer ("MUX") 259 whose second input terminal receives a Precise field, containing precise information on the next consecutive data address pair DA(m+2) currently under examination, from a Precise field source 261, and whose third input terminal receives a signal from a two-input sum module 263 that is discussed below. The MUX 259 also receives two control input signals C1 and C2 as shown.

If the predicted next consecutive data address pair DA(m+2) received from the predictor module Belongs To the current line segment so that this prediction is sufficiently accurate, the control input signals become C1=0 and C2=0 and the MUX 259 issues the signal received from the predictor module 257 as its output signal. If the predicted next consecutive data address pair DA(m+2) does not Belong To the current line segment, and a line segment parameter correction (introduced by the Sub-precise field or the Sub-run field) allows sufficient data address correction, the control input signals become C1=0 and C2=1, and the MUX 259 issues the output signal received from the sum module 263 as its own output signal.

If neither the predicted next consecutive data address received from the predictor module 257 nor the maximum parameter correction received from the sum module 263 is sufficient, the control input signals become C1=1 and C2=DC (don't care) and the MUX 259 issues the signal received from the Precise field source 261 as its output signal. The Precise field source signal will be issued for the first data address of each line and also when neither the predicted value nor the corrected value is sufficiently accurate.

The output signal from the data address register 255 is also received by the sum module 263, which also receives a line segment parameter correction signal, if any is required, from a Sub-precise field source 265. In a line segment with run length N>2, it is expected that the Sub-precise field source correction will be zero for most of the data addresses in that run so that the sum output signal of the sum module 263 will be the signal received at the other input terminal of the sum module 263. The Precise field source 261 and the Subprecise field source 265 are each driven by the clock signal CLK.

The output signal from the sum module 263 is received as a third input signal by the MUX 259, which issues one of its three input signals based on the control signals C1 and C2, as described above. This output signal is received by the data address register 255, and the previous contents of the register 255 are moved to a two-input MUX 267 that also receives the Precise field data address and corresponding control signal (C1) from the Precise field source 261.

The output signal from the MUX 259 is received by the data address register 255. This signal represents the predicted, corrected or exact next consecutive data address pair DA(m+2). The data address registers 253 and 255 now contain the consecutive data address pairs DA(m+1) and DA(m+2), respectively, and the process repeats itself until the other end of the line is reached.

The output signal from the data address register 255 is received at a first input terminal by a second MUX 267 that has two input terminals and a control input terminal. The MUX 267 also receives the output signal from the Precise field source 261 and the first control input signal C1 at the second input terminal and the control input terminal, respectively. The output signal from the MUX 267 is received by the first data address register 253. This output signal is either the signal received from the Precise field source 261 or the data address pair DA(m+1) issued by the second data register 255, depending on the value of the first control signal C1.

The output signal of the MUX 259 is also received by an output delay register 269 that is driven by the clock signal CLK and that reproduces the input signal at its output terminal after one clock cycle delay.

The Precise Field source 261 receives the 16-bit Precise field information illustrated in FIG. 4 and receives an indication whether the predicted next consecutive data address pair DA(m+2) Belongs To the current line segment whether a next consecutive data address Belongs To a corrected line segment (as provided by the Sub-precise field source 265), or whether the Precise field data address must be used. This information will determine the values of the control signals C1 and C2 issued by the source 261.

The Sub-precise Field source 265 will receive, or will have received, the Sub-precise, Sub-run, Short Run and Long Run fields of information (FIG. 4) and will issue a line segment correction signal for receipt by the sum module 263 only if the data address DA(m+2) does not Belong To the current line segment that the data address pairs DA(m) and DA(m+1) Belong To.

The data address registers 253 and 255, the delay output register 269, the Precise field source 261 and the Sub-precise field source 265 are each driven by a clock signal CLK received from a clock source 275.

In order to illustrate how the decompression apparatus 251 operates, the first few cycles of this apparatus will be considered here. Let [k]denote the contents of the component k at a stated clock cycle (k=253, 255, 257, 259, 261, 263, 265, 267, 269) and let DC (don't care) indicate that the contents of a particular component is of no concern. The contents of the sum module 263 will be written $[263]=(a,b)$, indicating that the two addends a and b are presented to the sum module 263 for formation of the sum a +b. The contents of a three-input terminal MUX such as 259 will be written $[259]=(a,b,c)$ to indicate the three signals a, b and c that are presented to the MUX 259 for selection of one of these as an output according to the control input signals. The contents of the two-input terminal MUX 267 will be written $[267]=(d,e)$ by analogy.

Let the clock cycle have a time interval length $\Delta t$, and assume that the first data address in a line is called up at time $t=0$ and is loaded at time $t=\Delta t$. For the first few time cycles, the contents of the various components and the values of the various control input signals $C_1$, $C_2$ and $C_3$ will be as follows.

$t=0$ : Load [Precise]=[261]=$DAI_{Pr}$ into 259
$C_1=1$, $C_2$ and $C_3$ arbitrary
$[253]=[255]=[257]=[259]=[263]=[265]=[267]=[269]=DC$
$t=\Delta t$ : $C_1=C_2=C_3=DC$
$[261]=DAI_{Pr}$
$[265]=\Delta(DA1)$
$[259]=(DAI_{Pr}, DC, DC)$
$[255]=C_1 DAI_{Pr}+(1-C_1)$  $(C_2[263]+(1-C_2)$  $[257])$
$=DAI_{Pr}$
$[257]=C_1 \cdot DAI_{Pr}+(1-C_1)\cdot[255]=DAI_{Pr}$
$[257]=[263]=[267]=[271]=[273]=DC$
$[269]=DAI_{Pr}$
$t=2\Delta TL \Delta C_1=0, C_2=1, C_3=$arbitrary
$[261]=DA2Pr$ (DC)
$[265]=\Delta(DA2)$
$[263]=(DAI_{Pr}, (DA2))$
$[259]=(DA2_{Pr}, DAI_{Pr}+(DA2), DA2_{Pd})$
$[255]=[69]=C_1 DA2_{Pr}$  $+(1-C_1)\cdot(C_2 \cdot DA2_{Su}+(1-C_2)\cdot DC)=DA2_{Su}$
$267]=(DA2_{Pr}, DA2_{Su})$
$[253]=(1-C_1)\cdot DAI_{Pr}+C_1 \cdot DA2_{Pr}=DAI_{Pr}$
$[257]=([253], [255])$
$t=3\Delta t$: $C_1=0$, $C_2=0$, $C_3$ arbitrary
$[261]=DA3_{Pr}$ (DC)
$[265]=\Delta(DA3)$
$[263]=(DA2_{Su}, (DA3))$
$[259]=(DA3_{Pr}, DA2_{Su}+(DA3), DA3_{Pd})$
$[255]=[269]=C_1 \cdot DA3_{Pr}+(1-C_1)\cdot(C_2 \cdot DA3_{Su}$  $+(1-C_2)\cdot DA3_{Pd})=DA3_{Pd}$
$[253]=(1-C_1)\cdot DA2_{Su}+C_1 \cdot DA3_{Pr}$
$[257]=([253], [255])$ Here the following abbreviations have been used:
$DAm_{Pr}$=contents of Precise field source 261 at time $t=m\Delta t$;
$\Delta(DAm)$=parameter correction contents of Sub-precise field source 265 at time $t=m\Delta t$;
$DAm_{Su}=DA(m-1)+\Delta(DAm)$; and
$DAm_{Pd}=2 \cdot DA(m-1)-DA(m-2)$.

The output signal of the MUX 259 at time $t=m\Delta t$ ($m \geq 3$) is: (1) the predicted data address value $DAm_{Pd}$, if the actual data address DAm Belongs To the current line segment ($C_1=0$, $C_2=0$); (2) the corrected data address value $DAm_{Su}$, if $DAm_{Pd}$ is insufficiently accurate and a new line segment with new slope is required to approximate the actual data address DAm ($C_1=0$, $C_2=10$; and (3) the precise data address DAm$_{Pr}$ if neither the predicted data address nor the corrected data address is sufficiently accurate ($C_1=1$, $C_2$ arbitrary). The output signal from the MUX 259 will be loaded into the second data address register 255, for use in computing the predicted next consecutive data address, and into the output delay register 269 for possible issue thereof as the output signal (decompressed map data address) of the decompression apparatus 251 at a particular clock cycle $t=(m+1)\Delta t$.

I claim:

1. A method for animating a sequence of video image fields in real time, the method comprising the steps of:
   performing a selected video transformation as a sequence of ordered mappings, where each of the sequence of video mappings is generated and performed off-line and is represented as a pixel-to-pixel mapping;
   for each pixel-to-pixel mapping of a field, applying a compression mapping to that mapping to produce a compressed pixel mapping that approximates the original mapping;
   storing the compressed pixel mappings as an ordered sequence of such mappings and providing this sequence with an indicium that corresponds to and indicates the selected video transformation, where each such indicium corresponds and indicates a unique video transformation;
   whereby selection of a video transformation is implemented after selection of the corresponding indicium and application of the corresponding sequence of compressed pixel mappings to a presently received sequence of video fields presented in real time.

2. The method of claim 1, further comprising the steps of:
   selecting an indicium corresponding to a video transformation sequence as a sequence of video image fields is received;
   applying the sequence of compressed pixel mappings to the sequence of video image fields received; and
   displaying the results of applying this sequence of mappings to this sequence of image fields as a sequence of video images in real time.

3. The method of claim 2, further comprising the step of:
   providing a specification of at least one of the video image characteristics of high-light, color intensity and color for said video images; and
   modifying this specified video image characteristic after said video transformation is constructed and before said video transformation is applied to said sequence of video image fields.

4. The method of claim 1, further comprising the step of choosing said compressed pixel mappings so that, at any pixel address, each of said compression mappings has an error that is no larger than a predetermined error.

5. The method of claim 1, wherein the step of choosing said compression mapping comprises the steps of:
   providing a sequence of two-coordinate data addresses $(v,w)=(v_m,w_m)$ ($m=1,2,\ldots,M$) for said pixel-to-pixel mapping T, where $v_m$ represents the x-address of a pixel destination address under said mapping, with $v_m < v_{m+1}$ for all m, and where $w_m$ is a descriptive coordinate of a source pixel corresponding to the destination pixel address;
   providing a sequence of two-coordinate data addresses $(v_{cm},w_{cm})$ ($m=1,2,\ldots,M$) for said compressed pixel mapping, where $v_{cm}=v_m$ represents the -x.-address of a pixel destination address under said compressed pixel mapping and $w_{cm}$ is a Descriptive Coordinate of a source pixel corresponding to the destination pixel address;
   forming a graph of $v_m$ versus $w_m$ for the coordinate pairs $(v_m,w_m)$ ($m=1,2,\ldots,M$);
   for each coordinate $v=v_m$ ($m=1,2,\ldots,M$), providing an error interval defined by $w_m-\epsilon_m \leq w \leq w_m+\epsilon_m$, where $\epsilon_m$ is a predetermined positive number;
   for each coordinate $v=v_j$ ($j=1,2,\ldots,M$) on this graph, defining $$s_{j+1} = \frac{w_{j+1} + \epsilon_{j+1} - w_j}{v_{j+1} - v_j},$$

$$s_{j+1} = \frac{w_{j+1} - \epsilon_{j+1} - w_j}{v_{j+1} - v_j},$$

$$S_{j,k} = \min[s_j, s_{j+1},\ldots,s_k],$$

$$S_{j,k} = \max[s_j, s_{j+1},\ldots,s_k];$$

defining k1 as the largest integer in the range $1 < k < M$ for which:

$$S_{2,k} \leq S_{2,k} \text{ for } k=2,3,\ldots,k1,$$

and constructing a first line segment L1 on the graph defined by $w_c(v)=S_1(v-v_1)+w_1$ to approximately represent resent the coordinate pairs $(v_j,w_j)$ ($j=1,2,\ldots,k_1$) on the graph, where $S_1$ is a line slope that lies in the range $S_{1,k1} \leq S_1 \leq S_{1,k1}$;
   defining $w'_{k1}=S_1(v_{k1}-v_1)+w_1$, defining k2 as the largest integer in the range $k1 < k \leq M$ for which $$S_{k1,k} \leq S_{k1,k} \text{ for } k=k1+1, k1+2,\ldots,K2,$$

and constructing a line segment L2 on the graph defined by $w_c(v)=S_2(v-v_{k1})+w'_{k1}$ to approximately represent the coordinate pairs $(v_j,w_j)$ ($j=k1, 11+1,\ldots,k2$) on the graph, where $S_2$ is a line slope that lies in the range $S_{k1,k2} \leq S_2 \leq S_{k1,k2}$;
   for each integer kn ($n=2,3,\ldots$) defined iteratively as below, defining a line segment Ln by $w'_{kn}=S_n(v_{kn}-v_{k(n-1)})+w'_{k(n-1)}$, defining $k(n+1)$ as the largest integer in the range $kn < k \leq M$ for which $$S_{kn,k} \leq S_{kn,k} \text{ for } k=kn, kn+1, kn+2,\ldots,k(n+1),$$

and constructing a line segment $L(n+1)$ on the graph defined by $w_c(v)=S_{n+1}(v-v_{kn})+w'_{kn}$ to approximately represent the coordinate pairs $(v_j,w_j)$ ($j=k_n, kn+1,\ldots,k(n+1)$) on the graph, where $S_{n+1}$ is a line slope that lies in the range $S_{kn,k(n+1)} \leq S_{n+1} \leq k_{n,k(n+1)}$; and
   defining $w_{cm}=w_c(v=v_m)$ for $m=1,2,\ldots,M$ and defining said mapping T by the relation $T(v_m,w_m)=(v_{cm},w_{cm})$ ($m=1,2,\ldots,M$).

6. The method of claim 5, further comprising the step of choosing at least two of said error bounds $\epsilon_j$ to be equal.

7. The method of claim 5, further comprising the steps of:
   expressing each of said parameters $S_1$ and $w_1$ that define said first line segment L1 binary form as a p-bit number (p=12-14), with 10 bits of this number representing the whole number w-address and p-10 bits of this number representing the fractional w-address of this number for the parameter $S_1$ or $w_1$; and expressing each of said parameters $S_n$ and $w'_{kn}$ that define said nth line segment $Ln (n \geq 2)$ in the form $$S_n = S_{n-1} + \Delta S_n,$$

$$w'_{kn} = w'_{k(n-1)} + \Delta w'_{kn},$$

where $\Delta S_n$ and $\Delta w'_{kn}$ are each expressed as a q-bit number (q=12-14), with 5 bits of this number representing the whole number w-address and 7-9 bits of this number representing the fractional w-address of this number for the parameter $\Delta S_n$ or $\Delta w'_{kn}$.

8. The method of claim 7, further comprising the steps of:

expressing said parameter $\Delta S_n$ (n=2) in binary form as first and second associated numbers, with the first number having 16 bits, if $\Delta S_n < 1$, with 9 of the bits representing the fractional part of said parameter $\Delta S_n$, with a tenth bit being zero and the remaining 6 bits of this first number representing the run length RL of said line segment Ln, expressed as an integer in binary form, if $RL \leq 64$;

with the second number having six bits representing an excess run length RL-64 of said line segment Ln, if the run length of said line segment Ln satisfies the conditions $65 < RL < 128$; and representing the excess run length RL-64 of said line segment Ln if the run length of said line segment Ln satisfies the conditions $129 \leq RL \leq 1024$.

9. The method of claim 7, further comprising the steps of:

expressing said parameter $\Delta w'_{kn}$ (n=2) in binary form as first and second associated numbers, with the first number having 16 bits, if $\Delta w'_{kn} < 1$, with 9 of the bits representing the fractional part of said parameter $\Delta w'_{kn}$, with a tenth bit being zero and the remaining 6 bits of this first number representing the run length RL of said line segment Ln, expressed as an integer in binary form, if $RL \leq 64$;

with the second number having six bits representing an excess run length RL-64 of said line segment Ln, if the run length of said line segment Ln satisfies the conditions $65 \leq RL \leq 128$; and with the second number having ten bits representing the excess run length RL-64 of said line segment Ln if the run length of said line segment Ln satisfies the conditions $129 \leq RL \leq 1024$.

10. The method of claim 1, wherein said step of applying said compression mapping to said pixel-to-pixel mapping T comprises application of a linear predictor line-by-line to said pixel-to-pixel mapping T to a video image field to be transformed.

11. The method of claim 10, wherein said step of applying a compression mapping further comprises choice of a maximum error associated with said linear predictor that is no larger than a predetermined fraction f of the nearest neighbor distance between pixels.

12. A method of compression of data address information, where the information is available in the form of a collection of triples $(u, v, w) = (u_m, v_m, w_m)$ (m=1,2,..., M), where $w_m$ is a real number representing a descriptive coordinate of the source address of a pixel and $v_m$ and $u_m$ are real numbers representing the x-coordinate and y-coordinate, respectively, of the destination pixel address corresponding to that source address pixel under a predetermined pixel-to-pixel transformation T on a screen, the method comprising the steps of:

forming a graph of $v_m$ versus $w_m$ for the coordinate pairs $(v_m, w_m)$ for m=1,2,..., M with $v_m < v_{m+1}$ for all m;

for each coordinate $v = v_m$ (m=1,2,..., M) on this graph, providing an error interval defined by $w_m - \epsilon_m \leq w \leq w_m + \epsilon_m$ where $\epsilon_m$ is a predetermined positive number;

for each coordinate $v = v_j$ (j=1,2,..., M) on this graph, defining $$s_{j+1} = \frac{w_{j+1} + \epsilon_{j+1} - w_j}{v_{j+1} - v_j},$$

$$s_{j+1} = \frac{w_{j+1} - \epsilon_{j+1} - w_j}{v_{j+1} - v_j},$$

$$S_{j,k} = \min [s_j, s_{j+1}, \ldots, s_k],$$

$$S_{j,k} = \max [s_j, s_{j+1}, \ldots, s_k];$$

defining k1 as the largest integer in the range $1 < k \leq M$ for which $$S_{2,k} \leq S_{2,k} \text{ for } k=2,3, \ldots k1,$$

and construction a first line segment L1 on the graph defined by $w_c(v) = S_l(v - v_l) + w_l$ to approximately represent the coordinate pairs $(v_j, w_j)$ (j=1,2,..., k1) on the graph, where $S_l$ is a line slope that lies in the range $S_{1,k1} \leq S_1 \leq S_{1,k1}$;

defining $w'_{k1} = S_l(v_{k1} - v_l) + w_1$, defining k2 as the largest integer in the range $k1 < k \leq M$ for which $$S_{k1,k} \geq S_{k1,1} \text{ for } k=k1+1, k1+2, \ldots, k2,$$

and constructing a line segment L2 defined by $w_c(v) = S_2(v - v_{k1}) + w'_{k1}$ to approximately represent the coordinate pairs $(v_j, w_j)$ (j=k1, k1+1, ..., k2) on the graph, where $S_2$ is a line slope that lies in the range $S_{k1,k2} \leq S_2 \leq S_{k1,k2}$; and for each integer kn (n=2,3,...) defined iteratively as below, defining a line segment Ln by $w'_{kn} = S_n(v_{kn} - v_{k(n-1)}) + w'_{k(n-1)}$, defining k(n+1) as the largest integer in the range $kn < k \leq M$ for which $$S_{kn,k} \leq S_{kn,k} \text{ for } k=kn, kn+1, kn+2, \ldots, k(n+1),$$

and constructing a line segment L(n+1) on the graph defined by $w_c(v) = S_{n+1}(v - v_{kn}) + w'_{kn}$ to approximately represent the coordinate pairs $(v_j, w_j)$ (j=kn, kn+1), defining $w_{cm} = w_c(v = v_m)$ for m=1,2...,M and defining said mapping T by the relation $T(v_m, w_m) = (v_{cm}, w_{cm})$ (m=1,2...,M).

13. The method of claim 10, further comprising the step of choosing at least two of said error bounds $\epsilon_j$ to be equal.

14. The method of claim 10, further comprising the steps of:

expressing each of said parameters $S_1$ and $w_1$ that define said first line segment L1 binary form as a p-bit number (p=12-14), with 10 bits of this number representing the whole number w-address and p-10 bits of this number representing the fractional w-address of this number for the parameter $S_1$ or $w_1$; and expressing each of said parameters $S_n$ and $w'_{kn}$ that define said kth line segment Ln (n=2) in the form $$S_n = S_{n-1} + \Delta S_n.$$

$$w'_{kn} = w'_{k(n-1)} + \Delta w'_{kn}.$$

where $\Delta S_n$ and $\Delta w'_{kn}$ are each expressed as a q-bit number (q=12–14), with 5 bits of this number representing the whole number w-address and 7–9 bits of this number representing the fractional w-address of this number for the parameter $\Delta S_n$ or $\Delta w'_{kn}$.

15. The method of claim 14, further comprising the steps of:

expressing said parameter $\Delta S_n$ (n=2) in binary form as first and second associated numbers, with the first number having 16 bits, if $\Delta S_n < 1$, with 9 of the bits representing the fractional part of said parameter $\Delta S_n$, with a tenth bit being zero and the remaining 6 bits of this first number representing the run length RL of said line segment Ln, expressed as an integer in binary form, if $RL \leq 65$;

with the second number having six bits representing an excess run length RL-64 of said line segment Ln, if the run length of said line segment Ln satisfies the conditions $65 \leq RL \leq 128$; and with the second number having ten bits representing the excess run length RL-64 of said line segment Ln if the run length of said line segment Ln satisfies the conditions $129 \leq RL \leq 1024$.

16. The method of claim 14, further comprising the steps of:

expressing said parameter $\Delta w'_{kn}$ (n=2) in binary form as first and second associated numbers, with the first number having 16 bits, if $\Delta w'_{kn} < 1$, with 9 of the bits representing the fractional part of said parameter $\Delta w'_{kn}$, with a tenth bit being zero and the remaining 6 bits of this first number representing the run length RL of said line segment Ln, expressed as an integer in binary form, if $RL \leq 64$;

with the second number having six bits representing an excess run length RL-64 of said line segment Ln, if the run length of said line segment Ln satisfies the conditions $65 \leq RL \leq 128$; and with the second number having ten bits representing the excess run length RL-64 of said line segment Ln if the run length of said line segment Ln satisfies the conditions $129 \leq RL \leq 1024$.

17. A method of representing a video image edge that defines a boundary between a first image and a second, different image, where an image is represented by a rectangular array of pixels, each pixel having two dimensional coordinates $(x_m, y_n)$ representing the pixel's position on a display screen and having a pixel value $pv(x_m, y_n)$ associated with the pixel positioned at $(x_m, y_n)$, the method comprising the steps of:

if the edge separates the pixel having coordinates $(x_m, y_n)$ from at least one of the pixels having coordinates $(x_{m+m}, Y_n)$ and $(x_m, Y_{n+n})$ providing predetermined non-negative coefficients $c_0$, $c_1$ and $c_2$ and forming an interpolated pixel value $pv(x_m, y_n)_{int}$ defined by the relations $$pv(x_m, y_n)_{int} = c_0 pv(x_{m-m}, Y_n) + c_1 pv(x_m, y_n) + c_2 pv(x_m, Y \text{ hd } n+n).$$

$$c_0 + c_1 + c_2 = 1; \text{ and}$$

replacing the pixel value $pv(x_m, y_n)$ by $pv(x_m, y_n)_{int}$, and forming and displaying on a video screen the first and second images with the pixel value $pv(x_m, y_n)_{int}$ being substituted.

18. Apparatus for reconstruction from a compressed pixel mapping, of an approximation to an original pixel-to-pixel mapping that existed before compression, where the original mapping maps a first ordered sequence of pixel data addresses into a second sequence of data addresses so that the second sequence corresponds to and provides approximations for precise data addresses in the first sequence, and the original mapping is approximated by an approximation mapping that is a collection of linear mappings of consecutive groups of two or more pixel data addresses into a third sequence of data addresses, the apparatus comprising:

a first information source to receive, for each data address, a first information field containing the precise data address for each pixel in the domain of the approximation mapping, to issue the precise data address as an output signal, to issue first and second control output signals indicating whether the precise data address or an approximate data address is to be used for that data address, and to receive a clock pulse at a clock input terminal;

a second information source to receive, for each data address, a second information field indicating the correction required, if any, for a line segment parameter so that the data address belongs to the line segment with corrected line segment parameter, and to issue this information as an output signal corresponding to that data address, and to receive a clock pulse at a clock input terminal;

a first multiplexer having first, second, and third input terminals; and first and second control input terminals; and an output terminal; to receive the output signal of the first information source at its' first input terminal; to receive the first and second control output signals at its' first and second control terminals; and to issue as an output signal the signal received at the first input terminal, at the second input terminal, or at the third input terminal according to the values of the first and second control signals received;

a first data address register having an input terminal, a clock input terminal, and an output terminal, to receive and temporarily hold a first data address from the first multiplexer and to issue this data address as an output signal when the clock input terminal receives a clock pulse;

a second multiplexer having first and second input terminals, a control input terminal)and an output terminal, to receive the output signals from the first information source and from the first data address register at its' first and second input terminals, respectively, to receive the first control signal from the first information source at its control input terminal, and to issue as an output signal the signal received at its' first input terminal or at its' second input terminal according to the value of the first control signal received;

a second data address register having an input terminal, a clock input terminal, and an output terminal; to receive and temporarily hold a second data address that is the output signal from the second multiplexer and to issue this address as an output signal when the clock input terminal receives a clock pulse;

signal summation means having first and second input terminals to receive the output signals of the second information source and the first data address register thereat and to form and issue the sum of these two input signals as an output signal;

predictor means having first and second input terminals, for receiving as input signals the first and second data address register output signals and for forming and issuing, as an output signal, a weighted sum of these two input signals as a prediction of the next consecutive data address based upon the first and second data addresses received, where the output signals of the signal summation means and the predictor means are received as input signals at the second and third input terminals of the first multiplexer;

a delay register having an input terminal, a clock input terminal, and an output terminal to receive the first multiplexer output signal at its input terminal and to issue the signal received as an output signal, when the clock input terminal receives a clock pulse thereat; and a clock pulse source to provide a sequence of periodic clock pulses for the clock input terminals of the first and second information sources, the first and second data address register), and the delay register;

whereby the output signal of the third multiplexer reproduces the pixel mapping that approximates the original pixel-to-pixel mapping.

19. Apparatus for forming and issuing pixel value signals that determine a video image, defined by a rectangular array of pixels, to be displayed on a video screen, beginning with a compressed mapping of the pixels, the apparatus comprising:

first and second field buffers for receiving, storing, and issuing as output signals pixel values that determine image intensity or image high-light for first and second interlaced fields of pixels representing a video image under a compression mapping of the pixels;

third and fourth field buffers for receiving, storing, and issuing as output signals pixel values that determine image surface characteristics for the first and second interlaced fields of pixels;

fifth and sixth field buffers for receiving, storing, and issuing as output signals pixel values that determine the pixel source x-address of the video image for the first and second interlaced fields of pixels;

seventh and eighth field buffers for receiving, storing, and issuing as output signals pixel values that determine the pixel source y-address of the video image for the first and second interlaced fields of pixels;

first decompression means, for receiving the first and second field buffer output signals and applying a decompression mapping to these signals to produce decompressed first and second fields of pixel values representing decompressed video image intensity or video image high-light pixel values, and for issuing the decompressed first and second fields as output signals;

second decompression means, for receiving the third and fourth field buffer output signals and applying a decompression mapping to these signals to produce decompressed third and fourth fields of pixel values representing decompressed video image surface characteristics pixel values, and for issuing the decompressed third and fourth fields as output signals;

third decompression means, for receiving the fifth and sixth buffer output signals and applying a decompression mapping to these signals to produce decompressed fifth and sixth fields of pixel values representing decompressed video image pixel destination x-addresses, and for issuing the decompressed fifth and sixth fields as output signals;

fourth decompression means, for receiving the seventh and eighth buffer output signals and applying a decompression mapping to these signals to produce decompressed fifth and sixth fields of pixel values representing decompressed video image pixel destination y-addresses, and for issuing the decompressed seventh and eighth fields as output signals;

high-light/color determination means, for receiving the output signals from the first and second decompression means, for forming and issuing a first high-light/color module output signal representing high-light or intensity of a pixel, and for forming and issuing a second high-light/color module output signal representing the B-Y color component of a pixel;

address/color means, for receiving the second, third and fourth decompression means output signals, for forming and issuing a first output signal representing the Y and R-Y color components of a pixel and for forming and issuing a second output signal representing the x-address and y-address of a pixel;

a background color register, having an input terminal to receive a background color control signal that determines a background color, if any, for a pixel and having an output terminal that issues an output signal representing the background color choice for that pixel;

a first multiplexer; having three input terminals, a control input terminal and an output terminal, that receives the background color register output signal at a first terminal; that receives the Y, R-Y, and B-Y color component signals at a second input terminal; that receives a supplemental pixel color signal at a third input terminal; and that issues the signal received at the first, second or third input terminal as an output signal at the output terminal; depending on the control signal received at the control input terminal;

color palette means, having an input terminal, a control input terminal, and an output terminal; for receiving the first multiplexer output signal at the input terminal; for receiving a color control signal at the input control terminal; and for forming and issuing a palette color output signal that determines the basic color for a pixel;

blend color means, having a first input terminal for receiving a blend color command signal, having a second input terminal for receiving a pixel specification signal that identifies the pixel for which the blend color command signal is received, and having an output terminal for issuing the blend color command signal, and a signal identifying the pixel to which the blend color command signal corresponds, as output signals;

a second multiplexer, having two input terminals, a control input terminal, and an output terminal; to receive the first multiplexer ;output signal and the color palette means of the first and second input terminals, respectively, to receive a control signal at the control input terminal; and to issue at the output terminal the signal received at the first input terminal or at the second input terminal, depending upon the control signal received; and intensity/high-light color mixer means, having four input terminals, a control input terminal, and an output terminal; for receiving the second multiplexer output signal, the blend color means output signal, the high-light/color means output signal, and the second decompression means output signal at the first, second, third, and fourth input terminals, respectively, for receiving at the control input terminal a control signal indicating the pixel whose pixel value is determined by the first, second, third, and fourth input signals; for forming and issuing at the output terminal a pixel value signal for which color, high-light, and intensity are determined.

* * * * *

UNITED STATES PATENT AND TRADEMARK OFFICE
CERTIFICATE OF CORRECTION

PATENT NO. : 5,119,442                    Page 1 of 15

DATED : June 2, 1992

INVENTOR(S) : William B. Brown

It is certified that error appears in the above-identified patent and that said Letters Patent is hereby corrected as shown below:

Column 1, line 19, "50- -60" should read - - 50-60 - -.

Column 2, line 16, "high-lighting" should read
    - - highlighting - -.

Column 2, line 45, "high-light" should read
    - - highlight - -.

Column 3, line 32, "(i > i + 1)" should read
    - - (i —> i + 1) - -.

Column 3, line 43, "from storage." should read - - from
    storage with that transformation. - -.

Column 3, line 47, "mappings corresponding to" should read
    - - mappings, corresponding to - -.

Column 3, line 49, "i = 1, 2, 3,.   In" should read
    - - i = 1, 2, 3,. . . . In - -.

Column 3, line 58, "of video images" should read
    - - of video image fields - -.

Column 4, line 18, "an optical drive 18" should read
    - - an optical drive 187, - -.

Column 4, line 21, "computer 178" should read
    - - computer 188, - -.

Column 5, lines 13, 37, 38, 40, 41 and 63, "high-light" should
    read - - highlight - -.

UNITED STATES PATENT AND TRADEMARK OFFICE
CERTIFICATE OF CORRECTION

PATENT NO. : 5,119,442
DATED : June 2, 1992
INVENTOR(S) : William B. Brown

It is certified that error appears in the above-identified patent and that said Letters Patent is hereby corrected as shown below:

Column 6, line 9, delete "35" after "is received".

Column 6, lines 19, 22, 27, 31 and 52, "high-light" should read -- highlight --.

Column 7, line 6, "addresse $(x_{n-1}, Y_m)$, the post interpolation module 143" should read -- addresses $(x_{n-1}, Y_m)$, $(x_n, Y_m)$ and $(x_n, Y_{m-1})$ to produce a --.

Column 7, lines 12-13, part of equation (1), "$(x_n, Y_m)$" should read -- $(x_n, Y_m)$ --.

Column 7, line 21, "$(x_n, Y_{m-1})$ Three" should read -- $(x_n, Y_{m-1})$. Three --.

Column 7, lines 54-55, equation (3),
"$pv(x_{n+k}, Y_m)int = c_1(k)pv(x_{n+k}, Y_m) + c_2(k)pv(x_{n+k}, Y_m)_2 (k = 0,1,...,N),$" should read
-- $pv(x_{n+k}, Y_m)_{int} = c_1(k)pv(x_{n+k}, Y_m) + c_2(k)pv(x_{n+k}, Y_m)_2 \ (k = 0,1,...,N)$ --.

Column 7, line 66, "$pv(x_{n+k}, Y_m)int$" should read -- $pv(x_{n+k}, Y_m)_{int}$ --

Column 7, line 67, "$pv(xn+k, Y_{m-1})$" should read -- $pv(x_{n+k}, Y_{m-1})$ --.

UNITED STATES PATENT AND TRADEMARK OFFICE
CERTIFICATE OF CORRECTION

PATENT NO. : 5,119,442
DATED : June 2, 1992
INVENTOR(S) : William B. Brown

It is certified that error appears in the above-identified patent and that said Letters Patent is hereby corrected as shown below:

Column 7, line 68, delete the word "comes" after "becomes".

Column 8, line 50, "high-light" should read -- highlight --.

Column 8, line 66, "$(v_i,w_1)$" should read -- $(v_1,w_1)$ --.

Column 8, line 67, "$(v_w,w_2)$" should read -- $(v_2,w_2)$ --.

Column 9, line 12, "$(v_i,w_1)$" should read -- $(v_1,w_1)$ --.

Column 9, line 26, "$(w_4,w_4)$" should read -- $(v_4,w_4)$ --.

Column 9, line 56, "$((s_j, b\}_j$" should read -- $\{(s_j,b_j)\}_j$ --.

Column 10, lines 21 and 24, "high-light" should read -- highlight --.

Column 10, line 48, "$f_p 2^m$" should read -- $f_p/2^m$ --.

Column 10, line 53, "$f_p 2^m$" should read -- $f_p/2^m$ --.

Column 10, line 53, "10-24" should read -- 1024 --.

Column 10, line 54, "$2^{m-1}$" should read -- $2^m-1$ --.

Column 10, lines 65 and 68, "$f_s/s^n$" should read -- $f_s/2^n$ --.

Column 11, line 25, "LSD" should read -- LSB --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Column 12, lines 1-20, equation (7) and equations (1) to (6),

"
$$\check{s}_j = \frac{C(j) - C(i) - \epsilon_j}{v_j - v_i} \le s(j) \le \frac{C(j) - C(i) - \epsilon_j}{v_j - v_i} = \hat{s}_j \quad (7)$$

One of six mutually exclusive events occurs:

$$\check{s}_j < \max[\hat{s}_{i+1}, \hat{s}_{i+2}, \ldots, \hat{s}_{j-1}] = (\max)_{i+1, j-1} \quad (1)$$

$$\hat{s}_j \ge (\max)_{j-1} \text{ and } \check{s}_j < (\max)_{i+1, j-1} \quad (2)$$

$$(\max)_{i+1, j-1} \le \check{s}_j < \hat{s}_j \le \min[\hat{s}_{i+1}, \hat{s}_{i+2}, \ldots, \hat{s}_{j-1}] = (\min)_{i+1, j-1} \quad (3)$$

$$\check{s}_j \le (\min)_{i+1, j-1} \text{ and } \hat{s}_j \le (\min)_{j-1} \quad (4)$$

$$\check{s}_j > (\min)_{i+1, j-1}; \text{ or} \quad (5)$$

$$\hat{s}_j \ge (\min)_{i+1, j-1} \text{ and } \check{s}_j \le (\max)_{i+1, j-1} \quad (6)$$

" should read --

$$\check{s}_j = \frac{C(j) - C(i) - \epsilon_j}{v_j - v_i} \le s(j) \le \frac{C(j) - C(i) + \epsilon_j}{v_j - v_i} = \hat{s}_j \quad (7)$$

One of six mutually exclusive events occurs:

(1) $\hat{s}_j < \max[\check{s}_{i+1}, \check{s}_{i+2}, \cdots, \check{s}_{j-1}] = (\max)_{i+1, j-1}$;

(2) $\hat{s}_j \ge (\max)_{j-1}$ and $\check{s}_j < (\max)_{i+1, j-1}$;

(3) $(\max)_{i+1, j-1} \le \check{s}_j < \hat{s}_j \le \min[\check{s}_{i+1}, \check{s}_{i+2}, \cdots, \check{s}_{j-1}]$
$\quad = (\min)_{i+1, j-1}$;

(4) $\check{s}_j \le (\min)_{i+1, j-1}$ and $\hat{s}_j > (\min)_{i+1, j-1}$;

(5) $\check{s}_j > (\min)_{i+1, j-1}$; or (6) $\hat{s}_j \ge (\min)_{i+1, j-1}$ and $\check{s}_j \le (\max)_{i+1, j-1}$.

-- .

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Column 12, line 35, equation (8),
  "$Z_{j-1} = [(max)_{j-1} \cdot (min)_{j-1}]/2$" should read
  -- $Z_{j-1} = [(max)_{j-1} + (min)_{j-1}]/2$ --.

Column 12, line 39, equation (9), "$Z_{j-1} = [(max)_{j-1} \cdot (min)_{j-1}]1/2$" should read -- $Z_{j-1} = [(max)_{j-1} \cdot (min)_{j-1}]^{1/2}$ --.

Column 12, line 52, "j°2" should read -- j+2 --.

Column 13, line 21, "EGj" should read -- EBj --.

Column 13, line 22, "K1" should read -- k1 --.

Column 13, line 25, equation (19),
  "$w'_{k1} = S_1(w_{k1}-w_1) + w_1$" should read
  -- $w'_{k1} = S_1(w_{k1}-v_1) + w_1$ --.

Column 13, line 37, equation (21),
  "$w = S_2(V-v_{k1}) + w'_{k1}$ $(S_{k1,k2} \leq S_2 \leq S_{k1,k1})$" should read
  -- $w = S_2(v-v_{k1}) + w'_{k1}$ $(\check{S}_{k1,k2} \leq S_2 \leq \hat{S}_{k1,k1})$ Column 13, line 42, equation (22), "$w'_{kw} =$       " should read
  -- $w'_{k2} =$       --.

Column 13, line 51, "(U = constant)" should read
  -- (u = constant) --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Column 13, line 53, "w32 source highlight" should read
-- w = source highlight --.

Column 14, line 6, "W = W($v_j$) (j=1,2,3,...), if W($v_m$) and" should read -- w = w($v_j$) (j=1,2,3,...), if w($v_m$) and --.

Column 14, line 29, "$\Delta$m" should read -- $\Delta_m$ --.

Column 16, line 23, "... = $DAI_{Pr}$ into 259" should read -- ... = $DA1_{Pr}$ into 259 --.

Column 16, lines 25-26, "[2-69]" should read -- [269] --.

Column 16, line 27, "t = $\Delta t$ : $C_1$,= $C_2$ = $C_3$ = DC" should read -- t = $\Delta t$ : $C_1$ = 1, $C_2$ = $C_3$ = DC --.

Column 16, line 30, "[259] = ($DAI_{Pr}$, DC, DC)" should read -- [259] = ($DA1_{Pr}$, DC, DC) --.

Column 16, lines 31 and 32,
"[255] = $C_1 DAI_{Pr}$+(1-$C_1$)  ($C_2$[263]+(1-$C_2$)  [257]) = $DAI_{Pr}$ should read -- [255] = $C_1 \cdot DA1_{Pr}$+(1-$C_1$) $\cdot$ ($C_2 \cdot$[263]+(1-$C_2$) $\cdot$ [257]) = $DA1_{pr}$ --.

UNITED STATES PATENT AND TRADEMARK OFFICE
CERTIFICATE OF CORRECTION

PATENT NO. : 5,119,442
DATED : June 2, 1992
INVENTOR(S) : William B. Brown

It is certified that error appears in the above-identified patent and that said Letters Patent is hereby corrected as shown below:

Column 16, line 33, "[257] = $C_1 \cdot DA1_{Pr}$," should read
-- [253] = $C_1 \cdot DA1_{Pr}$, --.

Column 16, line 36, "t = 2$\Delta$TL $\Delta C_{-1}$ = 0, $C_2$ = 1, $C_3$ = arbitrary" should read -- t = 2$\Delta$T: $\Delta C_1$ = 0, $C_2$ = 1, $C_3$ = arbitrary --.

Column 16, line 37, "[261] = DA2Pr (DC)" should read -- [261] = $DA2_{Pr}$ (DC) --.

Column 16, lines 39 and 40, "$DAI_{Pr}$" should read
-- $DA1_{Pr}$ --.

Column 16, lines 41-42
" [255] = [69] = $C_1 DA2_{Pr}$ + (1-$C_1$)·($C_2 \cdot DA2_{Su}$ + (1-$C_2$)·DC) = $DA2_{Su}$" should read
-- [255] = [69] = $C_1 \cdot DA2_{Pr}$ +
(1-$C_1$)·($C_2 \cdot DA2_{Su}$+(1-$C_2$)·DC) = $DA2_{Su}$ --.

Column 16, lines 52-53, " + (1-$C_2$ " should read
-- + (1-$C_2$) --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Column 16, after line 53, between [255] and [253], insert
-- [267] = ($DA3_{Pr}$, $DA3_{Su}$) --.

Claim 3, column 17, line 51, "high-light" should read
-- highlight --.

Claim 5, column 17, line 68, "vm < vm+1" should read
-- $V_m < V_{m+1}$ --.

Claim 5, column 18, line 3, "two-coordinate..data.., ad-" should read -- two-coordinate data ad- --.

Claim 5, column 18, line 6, "the -x.-address of a pixel" should read -- the x-address of a pixel --.

Claim 5, column 18, lines 12-13, "prod-ding" should read
-- providing --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 5, column 18, lines 19-27, the equations:

"$$s_{j+1} = \frac{w_{j+1} + \epsilon_{j+1} - w_j}{v_{j+1} - v_j},$$

$$s_{j+1} = \frac{w_{j+1} - \epsilon_{j+1} - w_j}{v_{j+1} - v_j},$$

$$S_{j,k} = \min [s_j, s_{j+1}, \ldots, s_k],$$

$$S_{j,k} = \max [s_j, s_{j+1}, \ldots, s_k];"$$ should read

--

$$\hat{s}_{j+1} = \frac{w_{j+1} + \epsilon_{j+1} - w_j}{v_{j+1} - v_j},$$

$$\check{s}_{j+1} = \frac{w_{j+1} - \epsilon_{j+1} - w_j}{v_{j+1} - v_j},$$

$$\hat{S}_{j,k} = \min [\hat{s}_j, \hat{s}_{j+1}, \ldots, \hat{s}_k],$$

$$\check{S}_{j,k} = \max [\check{s}_j, \check{s}_{j+1}, \ldots, \check{s}_k];$$

--.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 5, column 18, line 30, "$1 < k < M$" should read
-- $1 < k \leq M$ --.

Claim 5, column 18, line 31, "$S_{2,k} \leq S_{2,k}$ for $k = 2,3,\ldots,k1$," should read
-- $\hat{S}_{2,k} \geq \check{S}_{2,k}$ for $k = 2,3,\ldots,k1$, --.

Claim 5, column 18, line 34, delete "resent" after "represent".

Claim 5, column 18, line 36, "$S_{1,k1} \leq S_1 \leq S_{1,k1}$;" should read
-- $\check{S}_{1,k1} \leq S_1 \leq \hat{S}_{1,k1}$; --.

Claim 5, column 18, line 40,
"$S_{k1,k} \geq S_{k1,k}$ for $k = k1+1, k1+2,\ldots,K2$," should read
-- $\hat{S}_{k1,k} \geq S_{k1,k}$ for $k = k1+1, k1+2,\ldots,k2$, --.

Claim 5, column 18, line 43, "$(j = k1, 11+1,\ldots,k2)$" should read
-- $(j = k1, k1+1,\ldots,k2)$ --.

Claim 5, column 18, line 45, "$S_{k1,k2} \leq S_2, \leq S_{k1,k2}$;" should read
-- $\check{S}_{k1,k2} \leq S_2, \leq \hat{S}_{k1,k2}$; --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 5, column 18, line 51, "$S_{kn,k} \geq S_{kn,k}$ for" should read
-- $\hat{S}_{kn,k} \geq \check{S}_{kn,k}$ for --.

Claim 5, column 18, line 57, "$S_{kn,k(n+1)} \leq S_{n+1} \leq k_{n,k(n+1)}$" should read
-- $\check{S}_{kn,k(n+1)} \leq S_{n+1} \leq \hat{S}_{kn,k(n+1)}$ --.

Claim 8, column 19, line 18, "(n = 2)" should read
-- (n $\geq$ 2) --.

Claim 8, column 19, line 29, "conditions 65 < RL < 128; and representing the" should read -- conditions 65 $\leq$ RL $\leq$ 128; and --.

Claim 8, column 19, line 30, "excess run length RL-64" should be a new subparagraph and should read
-- with the second number having ten bits representing the excess run length RL-64 --.

Claim 9, column 19, line 35, "(n = 2)" should read
-- (n $\geq$ 2) --.

Claim 9, column 19, line 39, "$\Delta, w'_{kn},$" should read
-- $\Delta\ w'_{kn},$ --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 12, column 20, lines 14-21, the equations:

"
$$s_{j+1} = \frac{w_{j+1} + \epsilon_{j+1} - w_j}{v_{j+1} - v_j},$$

$$s_{j+1} = \frac{w_{j+1} - \epsilon_{j+1} - w_j}{v_{j+1} - v_j},$$

$$S_{j,k} = \min [s_j, s_{j+1}, \ldots, s_k],$$
$$S_{j,k} = \max [s_j, s_{j+1}, \ldots, s_k];"$$ should read

--

$$\hat{s}_{j+1} = \frac{w_{j+1} + \epsilon_{j+1} - w_j}{v_{j+1} - v_j},$$

$$\check{s}_{j+1} = \frac{w_{j+1} - \epsilon_{j+1} - w_j}{v_{j+1} - v_j},$$

$$\hat{S}_{j,k} = \min [\hat{s}_j, \hat{s}_{j+1}, \ldots, \hat{s}_k],$$
$$\check{S}_{j,k} = \max [\check{s}_j, \check{s}_{j+1}, \ldots, \check{s}_k];$$ --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 12, column 20, line 25, "$S_{2,k} \leq S_{2,k}$ for" should read -- $\check{S}_{2,k} \leq \hat{S}_{2,k}$ for --.

Claim 12, column 20, line 27, "construction" should read -- constructing --.

Claim 12, column 20, lines 28-30, the subscript small letter "l" should be a number "1".

Claim 12, column 20, line 31, "$S_{1,k1} \leq S_1 \leq S_{1,k1}$;" should read -- $\check{S}_{1,k1} \leq S_1 \leq \hat{S}_{1,k1}$; --.

Claim 12, column 20, line 32, "$w'_{k1} = S_l(v_{kl}-v_l) + w_1$," should read -- $w'_{k1} = S_1(v_{k1}-v_1) + w_1$, --.

Claim 12, column 20, line 34, "$S_{k1,k} \geq S_{k1,1}$ for" should read -- $\hat{S}_{k1,k} \geq \check{S}_{k1,1}$ for --.

Claim 12, column 20, line 40, "$S_{k1,k2} \leq S_2 \leq S_{k1,k2}$;" should read -- $\check{S}_{k1,k2} \leq S_2 \leq \hat{S}_{k1,k2}$; --.

Claim 12, column 20, line 46, "$S_{kn,k} \leq S_{kn,k}$ for" should read -- $\hat{S}_{kn,k} \geq \check{S}_{kn,k}$ for --.

Claim 12, column 20, line 51, "kn+1)," should read -- kn+1,..., k(n+1)) on the graph, where $S_{n+1}$ is a line slope that lies in the range $\check{S}_{kn,k(n+1)} \leq S_{n+1} \leq \hat{S}_{kn,k(n+1)}$, --.

UNITED STATES PATENT AND TRADEMARK OFFICE
CERTIFICATE OF CORRECTION

PATENT NO. : 5,119,442

DATED : June 2, 1992

INVENTOR(S) : William B. Brown

It is certified that error appears in the above-identified patent and that said Letters Patent is hereby corrected as shown below:

Claim 12, column 20, line 52, "m = 1,2...,M" should read
-- m = 1,2,...,M --.

Claim 12, column 20, line 54, "(m = 1,2...,M" should read
-- (m = 1,2,...,M) --.

Claim 14, column 20, line 68, "(n = 2)" should read
-- (n ≥ 2) --.

Claim 15, column 21, line 13, "(n = 2)" should read
-- (n ≥ 2) --.

Claim 15, column 21, line 20, "RL ≤ 65" should read
-- RL ≤ 64 --.

Claim 16, column 21, line 31, "(n = 2)" should read
-- (n ≥ 2) --.

Claim 17, column 21, line 57, "$(x_{m+m}, Y_n)$ and $(x_m, Y_{n+n})$" should read
-- $(x_{m+m}, Y_n)$ and $(x_m, Y_{n+n})$ --.

Claim 17, column 21, lines 62-63,
"$pv(x_m, Y_n)_{int} = c_0 pv(x_{m+m}, Y_n) + c_1 pv(x_m, Y_n) + c_2 pv(x_m, Y\ hd\ n+n)$," should read
-- $pv(x_m, Y_n)_{int} = c_0\ pv(x_{m+m}, Y_n) + c_1\ pv(x_m, Y_n) + c_2\ pv(x_m, Y_{n+n})$, --.

UNITED STATES PATENT AND TRADEMARK OFFICE
CERTIFICATE OF CORRECTION

PATENT NO. : 5,119,442
DATED : June 2, 1992
INVENTOR(S) : William B. Brown

It is certified that error appears in the above-identified patent and that said Letters Patent is hereby corrected as shown below:

Claim 18, column 22, line 50, the parenthesis ")" after the word "terminal" should be a comma --,--.

Claim 18, column 23, line 24, delete parenthesis ")" after the word "register".

Claim 19, column 23, lines 37 and 58; column 24, lines 16, 20 and 21; column 25, lines 4 and 8; and column 26, line 8, "high-light" should read -- highlight --.

Column 24, line 65, "first multiplexer;output signal" should read -- first multiplexer output signal --.

Signed and Sealed this

Twenty-fourth Day of May, 1994

BRUCE LEHMAN

Attest:

Attesting Officer

Commissioner of Patents and Trademarks